(12) United States Patent
Van De Wetering et al.

(10) Patent No.: US 10,934,430 B2
(45) Date of Patent: Mar. 2, 2021

(54) HEAT RESISTANT, WEATHERABLE POLYESTER—POLYCARBONATE COMPOSITION

(71) Applicant: SABIC GLOBAL TECHNOLOGIES B.V., Bergen op Zoom (NL)

(72) Inventors: Karin Irene Van De Wetering, Noord-Brabant (NL); Francesco Acquasanta, Breda (NL)

(73) Assignee: SABIC GLOBAL TECHNOLOGIES B.V., Bergen Op Zoom (NL)

(*) Notice: Subject to any disclaimer, the term of this patent is extended or adjusted under 35 U.S.C. 154(b) by 276 days.

(21) Appl. No.: 15/780,094

(22) PCT Filed: Nov. 29, 2016

(86) PCT No.: PCT/EP2016/079094
§ 371 (c)(1),
(2) Date: May 30, 2018

(87) PCT Pub. No.: WO2017/093232
PCT Pub. Date: Jun. 8, 2017

(65) Prior Publication Data
US 2020/0165445 A1     May 28, 2020

Related U.S. Application Data

(60) Provisional application No. 62/262,614, filed on Dec. 3, 2015.

(30) Foreign Application Priority Data

Jul. 4, 2016 (EP) .................................... 16179388

(51) Int. Cl.
| | |
|---|---|
| C08L 69/00 | (2006.01) |
| C08L 67/02 | (2006.01) |
| C08G 63/183 | (2006.01) |
| C08F 220/18 | (2006.01) |
| C08F 212/08 | (2006.01) |
| C08F 236/06 | (2006.01) |

(52) U.S. Cl.
CPC .......... *C08L 69/005* (2013.01); *C08F 212/08* (2013.01); *C08F 220/18* (2013.01); *C08F 236/06* (2013.01); *C08G 63/183* (2013.01); *C08L 67/02* (2013.01); *C08L 69/00* (2013.01); *C08L 2201/08* (2013.01); *C08L 2205/035* (2013.01)

(58) Field of Classification Search
None
See application file for complete search history.

(56) References Cited

U.S. PATENT DOCUMENTS

| | | | |
|---|---|---|---|
| 4,226,961 A | 10/1980 | Motz | |
| 4,469,850 A * | 9/1984 | Belfoure | ................ C08L 69/00 524/537 |
| 4,677,150 A | 6/1987 | Chacko et al. | |
| 5,589,530 A | 12/1996 | Walsh | |
| 6,417,253 B1 | 7/2002 | Shakhnovich | |
| 7,309,730 B2 | 12/2007 | Kim | |
| 7,807,745 B2 | 10/2010 | Agarwal et al. | |
| 9,249,297 B2 | 2/2016 | Lyons et al. | |
| 2006/0148984 A1* | 7/2006 | Persigehl | ................ C08L 67/02 525/67 |
| 2008/0132617 A1 | 6/2008 | Eckel et al. | |
| 2008/0246181 A1 | 10/2008 | Zhu et al. | |
| 2008/0269399 A1* | 10/2008 | Chakravarti | .......... C08L 69/005 524/513 |
| 2009/0181199 A1* | 7/2009 | Agarwal | ................ C08L 67/02 428/36.8 |
| 2015/0240074 A1 | 8/2015 | Chen et al. | |
| 2015/0353732 A1 | 12/2015 | Wang | |

FOREIGN PATENT DOCUMENTS

| | | |
|---|---|---|
| WO | 0015718 A1 | 3/2000 |
| WO | 2013027165 A1 | 2/2013 |
| WO | WO 2015/163479 * | 10/2015 |

OTHER PUBLICATIONS

International Search Report for International Application No. PCT/EP2016/079094, International Filing Date Nov. 29, 2016, dated Mar. 13, 2017, 5 pages.
Written Opinion for International Application No. PCT/EP2016/079094, International Filing Date Nov. 29, 2016, dated Mar. 13, 2017, 9 pages.

* cited by examiner

*Primary Examiner* — David J Buttner
(74) *Attorney, Agent, or Firm* — Cantor Colburn LLP

(57) ABSTRACT

A thermoplastic composition comprising: 0 to 50 weight percent of a polycarbonate; 10 to 50 weight percent of a polyester carbonate copolymer; 5 to 20 weight percent of a poly(ethylene terephthalate); 20 to 50 weight percent of a poly(butylene terephthalate); and optionally 5 to 30 weight percent of an impact modifier wherein weight percent is based on the combined amounts of polycarbonate, polyester carbonate copolymer, poly(ethylene terephthalate), poly (butylene terephthalate) and optional impact modifier.

13 Claims, No Drawings

HEAT RESISTANT, WEATHERABLE POLYESTER—POLYCARBONATE COMPOSITION

CROSS REFERENCE TO RELATED APPLICATIONS

This application is a National Stage application of PCT/EP2016/079094, filed Nov. 29, 2016, which claims priority to European Application No. 16179388.0, filed Jul. 4, 2016, and which claims the benefit of U.S. Provisional Application No. 62/262,614, filed Dec. 3, 2015, all of which are incorporated by reference in their entirety herein.

BACKGROUND OF THE INVENTION

This disclosure relates to polycarbonate/polyester compositions, methods of manufacture, and uses thereof.

Polyester carbonate/polybutylene ether compositions are useful in the manufacture of articles and components for a wide range of applications, from automotive parts to electronic appliances. These compositions demonstrate good resistance to weathering but suffer from insufficient heat resistance.

There accordingly remains a need in the art for compositions that have weatherability and heat resistance.

SUMMARY OF THE INVENTION

The above-described and other deficiencies of the art are met by a thermoplastic composition comprising: 0 to 50 weight percent of a polycarbonate; 10 to 50 weight percent of a polyester carbonate copolymer; 5 to 20 weight percent of a poly(ethylene terephthalate); 20 to 50 weight percent of a poly(butylene terephthalate); and optionally 5 to 30 weight percent of an impact modifier wherein weight percent is based on the combined amounts of polycarbonate, polyester carbonate copolymer, poly(ethylene terephthalate), poly(butylene terephthalate) and optional impact modifier.

In another embodiment, a method of manufacture comprises combining the above-described components to form a thermoplastic composition.

In yet another embodiment, an article comprises the above-described thermoplastic composition.

In still another embodiment, a method of manufacture of an article comprises molding, extruding, or shaping the above-described thermoplastic composition into an article.

The above described and other features are exemplified by the following drawings, detailed description, examples, and claims.

DETAILED DESCRIPTION OF THE INVENTION

Polyester carbonate has been blended with polycarbonate to improve the weatherability of the polycarbonate. Unfortunately these blends suffer from a loss in heat resistance, even in the presence of colorants which can act as nucleating agents and increase heat resistance. Surprisingly, it has been found that incorporating low levels of poly(ethylene terephthalate) leads to considerable improvement in heat resistance without a loss of weatherability.

"Polycarbonate" as used herein means a polymer having repeating structural carbonate units of formula (1)

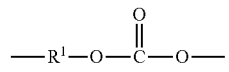

(1)

in which at least 60 percent of the total number of $R^1$ groups contain aromatic moieties and the balance thereof are aliphatic, alicyclic, or aromatic. In an embodiment, each $R^1$ is a $C_{6-30}$ aromatic group, that is, contains at least one aromatic moiety. $R^1$ can be derived from an aromatic dihydroxy compound of the formula HO—$R^1$—OH, in particular of formula (2)

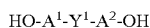

HO-$A^1$-$Y^1$-$A^2$-OH (2)

wherein each of $A^1$ and $A^2$ is a monocyclic divalent aromatic group and $Y^1$ is a single bond or a bridging group having one or more atoms that separate $A^1$ from $A^2$. In an embodiment, one atom separates $A^1$ from $A^2$. Specifically, each $R^1$ can be derived from a bisphenol of formula (3)

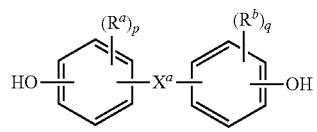

(3)

wherein $R^a$ and $R^b$ are each independently a halogen, $C_{1-12}$ alkoxy, or $C_{1-12}$ alkyl, and p and q are each independently integers of 0 to 4. It will be understood that when p or q is less than 4, the valence of each carbon of the ring is filled by hydrogen. Also in formula (3), $X^a$ is a bridging group connecting the two hydroxy-substituted aromatic groups, where the bridging group and the hydroxy substituent of each $C_6$ arylene group are disposed ortho, meta, or para (specifically para) to each other on the $C_6$ arylene group. In an embodiment, the bridging group $X^a$ is single bond, —O—, —S—, —S(O)—, —S(O)$_2$—, —C(O)—, or a $C_{1-18}$ organic group. The $C_{1-18}$ organic bridging group can be cyclic or acyclic, aromatic or non-aromatic, and can further comprise heteroatoms such as halogens, oxygen, nitrogen, sulfur, silicon, or phosphorous. The $C_{1-18}$ organic group can be disposed such that the $C_6$ arylene groups connected thereto are each connected to a common alkylidene carbon or to different carbons of the $C_{1-18}$ organic bridging group. In an embodiment, p and q is each 1, and $R^a$ and $R^b$ are each a $C_{1-3}$ alkyl group, specifically methyl, disposed meta to the hydroxy group on each arylene group.

In an embodiment, $X^a$ is a substituted or unsubstituted $C_{3-18}$ cycloalkylidene, a $C_{1-25}$ alkylidene of formula —C($R^c$)($R^d$)— wherein $R^c$ and $R^d$ are each independently hydrogen, $C_{1-12}$ alkyl, $C_{1-12}$ cycloalkyl, $C_{7-12}$ arylalkyl, $C_{1-12}$ heteroalkyl, or cyclic $C_{7-12}$ heteroarylalkyl, or a group of the formula —C(=$R^e$)— wherein $R^e$ is a divalent $C_{1-12}$ hydrocarbon group. Groups of this type include methylene, cyclohexylmethylene, ethylidene, neopentylidene, and isopropylidene, as well as 2-[2.2.1]-bicycloheptylidene, cyclohexylidene, cyclopentylidene, cyclododecylidene, and adamantylidene.

In another embodiment, $X^a$ is a $C_{1-18}$ alkylene, a $C_{3-18}$ cycloalkylene, a fused $C_{6-18}$ cycloalkylene, or a group of the formula —$B^1$-G-$B^2$— wherein $B^1$ and $B^2$ are the same or different $C_{1-6}$ alkylene and G is a $C_{3-12}$ cycloalkylidene or a $C_{6-16}$ arylene. For example, $X^a$ can be a substituted $C_{3-18}$ cycloalkylidene of formula (4)

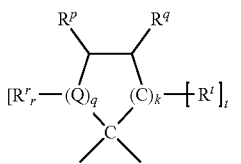

(4)

wherein $R^r$, $R^p$, $R^q$, and $R^t$ are each independently hydrogen, halogen, oxygen, or $C_{1-12}$ hydrocarbon groups; Q is a direct bond, a carbon, or a divalent oxygen, sulfur, or —N(Z)— where Z is hydrogen, halogen, hydroxy, $C_{1-12}$ alkyl, $C_{1-12}$ alkoxy, or $C_{1-12}$ acyl; r is 0 to 2, t is 1 or 2, q is 0 or 1, and k is 0 to 3, with the proviso that at least two of $R^r$, $R^p$, $R^q$, and $R^t$ taken together are a fused cycloaliphatic, aromatic, or heteroaromatic ring. It will be understood that where the fused ring is aromatic, the ring as shown in formula (4) will have an unsaturated carbon-carbon linkage where the ring is fused. When k is one and i is 0, the ring as shown in formula (4) contains 4 carbon atoms, when k is 2, the ring as shown in formula (4) contains 5 carbon atoms, and when k is 3, the ring contains 6 carbon atoms. In an embodiment, two adjacent groups (e.g., $R^q$ and $R^t$ taken together) form an aromatic group, and in another embodiment, $R^q$ and $R^t$ taken together form one aromatic group and $R^r$ and $R^p$ taken together form a second aromatic group. When $R^q$ and $R^t$ taken together form an aromatic group, $R^p$ can be a double-bonded oxygen atom, i.e., a ketone.

Bisphenols wherein $X^a$ is a cycloalkylidene of formula (4) can be used in the manufacture of polycarbonates containing phthalimidine carbonate units of formula (1a)

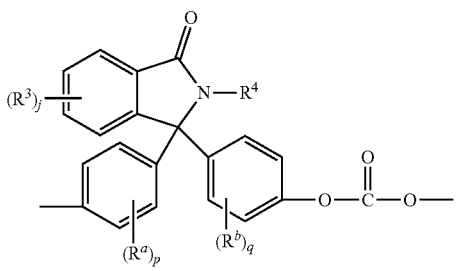

(1a)

wherein $R^a$, $R^b$, p, and q are as in formula (3), $R^3$ is each independently a $C_{1-6}$ alkyl, j is 0 to 4, and $R_4$ is hydrogen, $C_{1-6}$ alkyl, or a substituted or unsubstituted phenyl, for example a phenyl substituted with up to five $C_{1-6}$ alkyls. For example, the phthalimidine carbonate units are of formula (1b)

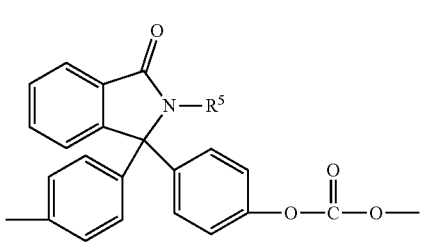

(1b)

wherein $R^5$ is hydrogen, phenyl optionally substituted with up to five 5 $C_{1-6}$ alkyls, or $C_{1-4}$ alkyl. In an embodiment in formula (1b), $R^5$ is hydrogen, methyl, or phenyl, specifically phenyl. Carbonate units (1b) wherein $R^5$ is phenyl can be derived from 2-phenyl-3,3'-bis(4-hydroxy phenyl)phthalimidine (also known as 3,3-bis(4-hydroxyphenyl)-2-phenylisoindolin-1-one, or N-phenyl phenolphthalein bisphenol ("PPPBP")).

Other bisphenol carbonate repeating units of this type are the isatin carbonate units of formula (1c) and (1d)

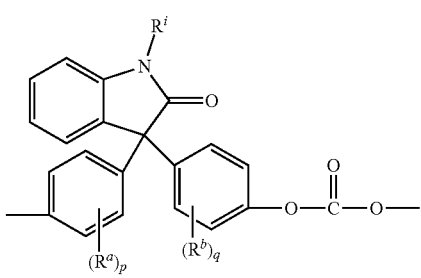

(1c)

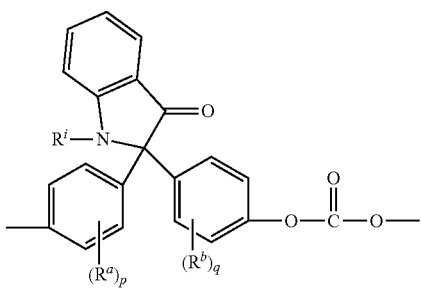

(1d)

wherein $R^a$ and $R^b$ are each independently a halogen, $C_{1-12}$ alkoxy, or $C_{1-12}$ alkyl, p and q are each independently 0 to 4, and $R^i$ is $C_{1-12}$ alkyl, phenyl optionally substituted with 1 to 5 $C_{1-10}$ alkyl, or benzyl optionally substituted with 1 to 5 $C_{1-10}$ alkyl. In an embodiment, $R^a$ and $R^b$ are each methyl, p and q are each independently 0 or 1, and $R^i$ is $C_{1-4}$ alkyl or phenyl.

Other examples of bisphenol carbonate units derived from of bisphenols (3) wherein $X^a$ is a substituted or unsubstituted $C_{3-18}$ cycloalkylidene (4) include the cyclohexylidene-bridged, alkyl-substituted bisphenol of formula (1e)

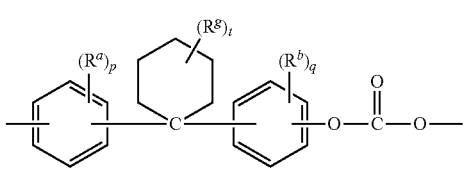

(1e)

wherein $R^a$ and $R^b$ are each independently $C_{1-12}$ alkyl, $R^g$ is $C_{1-12}$ alkyl, p and q are each independently 0 to 4, and t is 0 to 10. In a specific embodiment, at least one of each of $R^a$ and $R^b$ are disposed meta to the cyclohexylidene bridging group. In an embodiment, $R^a$ and $R^b$ are each independently $C_{1-4}$ alkyl, $R^g$ is $C_{1-4}$ alkyl, p and q are each 0 or 1, and t is 0 to 5. In another specific embodiment, $R^a$, $R^b$, and $R^g$ are each methyl, p and q are each 0 or 1, and t is 0 or 3, specifically 0.

Examples of other bisphenol carbonate units derived from bisphenol (3) wherein $X^a$ is a substituted or unsubstituted $C_{3-18}$ cycloalkylidene include adamantyl units of formula (1f) and fluorenyl units of formula (1g)

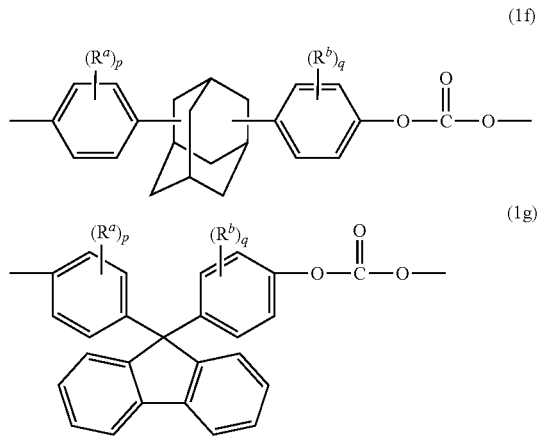

wherein $R^a$ and $R^b$ are each independently $C_{1-12}$ alkyl, and p and q are each independently 1 to 4. In a specific embodiment, at least one of each of $R^a$ and $R^b$ are disposed meta to the cycloalkylidene bridging group. In an embodiment, $R^a$ and $R^b$ are each independently $C_{1-3}$ alkyl, and p and q are each 0 or 1; specifically, $R^a$, $R^b$ are each methyl, p and q are each 0 or 1, and when p and q are 1, the methyl group is disposed meta to the cycloalkylidene bridging group. Carbonates containing units (1a) to (1g) are useful for making polycarbonates with high glass transition temperatures (Tg) and high heat distortion temperatures.

Other useful dihydroxy compounds of the formula HO—$R^1$—OH include aromatic dihydroxy compounds of formula (6)

wherein each $R^h$ is independently a halogen atom, $C_{1-10}$ hydrocarbyl group such as a $C_{1-10}$ alkyl, a halogen-substituted $C_{1-10}$ alkyl, a $C_{6-10}$ aryl, or a halogen-substituted $C_{6-10}$ aryl, and n is 0 to 4. The halogen is usually bromine.

Some illustrative examples of specific dihydroxy compounds include the following: 4,4'-dihydroxybiphenyl, 1,6-dihydroxynaphthalene, 2,6-dihydroxynaphthalene, bis(4-hydroxyphenyl)methane, bis(4-hydroxyphenyl) diphenylmethane, bis(4-hydroxyphenyl)-1-naphthylmethane, 1,2-bis(4-hydroxyphenyl)ethane, 1,1-bis(4-hydroxyphenyl)-1-phenylethane, 2-(4-hydroxyphenyl)-2-(3-hydroxyphenyl)propane, bis(4-hydroxyphenyl) phenylmethane, 2,2-bis(4-hydroxy-3-bromophenyl) propane, 1,1-bis (hydroxyphenyl)cyclopentane, 1,1-bis(4-hydroxyphenyl)cyclohexane, 1,1-bis(4-hydroxyphenyl) isobutene, 1,1-bis(4-hydroxyphenyl)cyclododecane, trans-2,3-bis(4-hydroxyphenyl)-2-butene, 2,2-bis(4-hydroxyphenyl)adamantane, alpha, alpha'-bis(4-hydroxyphenyl)toluene, bis(4-hydroxyphenyl)acetonitrile, 2,2-bis(3-methyl-4-hydroxyphenyl)propane, 2,2-bis(3-ethyl-4-hydroxyphenyl)propane, 2,2-bis(3-n-propyl-4-hydroxyphenyl)propane, 2,2-bis(3-isopropyl-4-hydroxyphenyl)propane, 2,2-bis(3-sec-butyl-4-hydroxyphenyl)propane, 2,2-bis(3-t-butyl-4-hydroxyphenyl)propane, 2,2-bis(3-cyclohexyl-4-hydroxyphenyl)propane, 2,2-bis(3-allyl-4-hydroxyphenyl)propane, 2,2-bis(3-methoxy-4-hydroxyphenyl)propane, 2,2-bis(4-hydroxyphenyl)hexafluoropropane, 1,1-dichloro-2,2-bis(4-hydroxyphenyl)ethylene, 1,1-dibromo-2,2-bis(4-hydroxyphenyl)ethylene, 1,1-dichloro-2,2-bis(5-phenoxy-4-hydroxyphenyl)ethylene, 4,4'-dihydroxybenzophenone, 3,3-bis(4-hydroxyphenyl)-2-butanone, 1,6-bis(4-hydroxyphenyl)-1,6-hexanedione, ethylene glycol bis (4-hydroxyphenyl)ether, bis(4-hydroxyphenyl)ether, bis(4-hydroxyphenyl)sulfide, bis(4-hydroxyphenyl)sulfoxide, bis (4-hydroxyphenyl)sulfone, 9,9-bis(4-hydroxyphenyl) fluorine, 2,7-dihydroxypyrene, 6,6'-dihydroxy-3,3,3',3'-tetramethylspiro(bis)indane ("spirobiindane bisphenol"), 3,3-bis(4-hydroxyphenyl)phthalimide, 2,6-dihydroxydibenzo-p-dioxin, 2,6-dihydroxythianthrene, 2,7-dihydroxyphenoxathin, 2,7-dihydroxy-9,10-dimethylphenazine, 3,6-dihydroxydibenzofuran, 3,6-dihydroxydibenzothiophene, and 2,7-dihydroxycarbazole, resorcinol, substituted resorcinol compounds such as 5-methyl resorcinol, 5-ethyl resorcinol, 5-propyl resorcinol, 5-butyl resorcinol, 5-t-butyl resorcinol, 5-phenyl resorcinol, 5-cumyl resorcinol, 2,4,5,6-tetrafluoro resorcinol, 2,4,5,6-tetrabromo resorcinol, or the like; catechol; hydroquinone; substituted hydroquinones such as 2-methyl hydroquinone, 2-ethyl hydroquinone, 2-propyl hydroquinone, 2-butyl hydroquinone, 2-t-butyl hydroquinone, 2-phenyl hydroquinone, 2-cumyl hydroquinone, 2,3,5,6-tetramethyl hydroquinone, 2,3,5,6-tetra-t-butyl hydroquinone, 2,3,5,6-tetrafluoro hydroquinone, 2,3,5,6-tetrabromo hydroquinone, or the like, or combinations comprising at least one of the foregoing dihydroxy compounds.

Specific examples of bisphenol compounds of formula (3) include 1,1-bis(4-hydroxyphenyl) methane, 1,1-bis(4-hydroxyphenyl) ethane, 2,2-bis(4-hydroxyphenyl) propane (hereinafter "bisphenol A" or "BPA"), 2,2-bis(4-hydroxyphenyl) butane, 2,2-bis(4-hydroxyphenyl) octane, 1,1-bis(4-hydroxyphenyl) propane, 1,1-bis(4-hydroxyphenyl) n-butane, 2,2-bis(4-hydroxy-2-methylphenyl) propane, 1,1-bis (4-hydroxy-t-butylphenyl) propane, 3,3-bis(4-hydroxyphenyl) phthalimidine, 2-phenyl-3,3-bis(4-hydroxyphenyl) phthalimidine (PPPBP), and 1,1-bis(4-hydroxy-3-methylphenyl)cyclohexane (DMBPC). Combinations comprising at least one of the foregoing dihydroxy compounds can also be used. In a specific embodiment, the polycarbonate is a linear homopolymer derived from bisphenol A, in which each of $A^1$ and $A^2$ is p-phenylene and $Y^1$ is isopropylidene in formula (3).

In some embodiments the polycarbonate is a homopolycarbonate of bisphenol A.

The polycarbonate can have a weight average molecular weight of 15,000 to 40,000 grams per mole (g/mol) when determined using gel permeation chromatography with polycarbonate standards.

The polycarbonate is present in an amount of 0 to 50 weight percent, or, 5 to 40 weight percent, or, 10 to 30 weight percent, based on the combined amounts of polycarbonate, polyester carbonate copolymer, poly(ethylene terephthalate), poly(butylene terephthalate) and optional impact modifier. In some embodiments the polycarbonate is present in an amount of 20 to 50 weight percent, based on the combined amounts of polycarbonate, polyester carbonate copolymer, poly(ethylene terephthalate), poly(butylene terephthalate) and optional impact modifier.

The composition also comprises a polyester carbonate copolymer (also known as a poly(ester-carbonate). Such copolymers further contain, in addition to recurring carbonate units of formula (1), repeating units of formula (7)

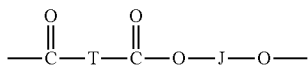
(7)

wherein J is a divalent group derived from a dihydroxy compound (including a reactive derivative thereof), and can be, for example, a $C_{2-10}$ alkylene, a $C_{6-20}$ cycloalkylene, a $C_{6-20}$ arylene, or a polyoxyalkylene in which the alkylene groups contain 2 to 6 carbon atoms, specifically 2, 3, or 4 carbon atoms; and T is a divalent group derived from a dicarboxylic acid (including a reactive derivative thereof), and can be, for example, a $C_{2-20}$ alkylene, a $C_{6-20}$ cycloalkylene, or a $C_{6-20}$ arylene. Copolyesters containing a combination of different T and/or J groups can be used. The polyester units can be branched or linear.

In an embodiment, J is a $C_{2-30}$ alkylene group having a straight chain, branched chain, or cyclic (including polycyclic) structure, for example ethylene, n-propylene, i-propylene, 1,4-butylene, 1,6-cyclohexylene, or 1,4-methylenecyclohexane. In another embodiment, J is derived from a bisphenol of formula (3), e.g., bisphenol A. In another embodiment, J is derived from an aromatic dihydroxy compound of formula (6), e.g, resorcinol.

Aromatic dicarboxylic acids that can be used to prepare the polyester units include isophthalic or terephthalic acid, 1,2-di(p-carboxyphenyl)ethane, 4,4'-dicarboxydiphenyl ether, 4,4'-bisbenzoic acid, or a combination comprising at least one of the foregoing acids. Acids containing fused rings can also be present, such as in 1,4-, 1,5-, or 2,6-naphthalenedicarboxylic acids. Specific dicarboxylic acids include terephthalic acid, isophthalic acid, naphthalene dicarboxylic acid, 1,4-cyclohexane dicarboxylic acid, or a combination comprising at least one of the foregoing acids. A specific dicarboxylic acid comprises a combination of isophthalic acid and terephthalic acid wherein the weight ratio of isophthalic acid to terephthalic acid is 91:9 to 2:98.

Specific ester units include ethylene terephthalate, n-propylene terephthalate, n-butylene terephthalate, 1,4-cyclohexanedimethylene terephthalate, and ester units derived from isophthalic acid, terephthalic acid, and resorcinol (ITR)). The molar ratio of ester units to carbonate units in the copolymers can vary broadly, for example 1:99 to 99:1, specifically 10:90 to 90:10, more specifically 25:75 to 75:25, or 2:98 to 15:85, depending on the desired properties of the final composition. Specific polyester carbonates are those including bisphenol A carbonate units and isophthalate-terephthalate-bisphenol A ester units, also commonly referred to as poly(carbonate-ester)s (PCE) or poly(phthalate-carbonate)s (PPC) depending on the molar ratio of carbonate units and ester units.

In a specific embodiment, the polyester carbonate copolymer is a poly(bisphenol A carbonate)-co-(bisphenol A-phthalate-ester) of formula (8a)

wherein y and x represent the weight percent of arylate-bisphenol A ester units and bisphenol A carbonate units, respectively. Generally, the units are present as blocks. In an embodiment, the weight percent of ester units y to carbonate units x in the copolymers is 50:50 to 99:1, or 55:45 to 90:10, or 75:25 to 95:5. Copolymers of formula (8a) comprising 35 to 45 wt. % of carbonate units and 55 to 65 wt. % of ester units, wherein the ester units have a molar ratio of isophthalate to terephthalate of 45:55 to 55:45 are often referred to as poly(carbonate-ester)s (PCE) and copolymers comprising 15 to 25 wt. % of carbonate units and 75 to 85 wt. % of ester units having a molar ratio of isophthalate to terephthalate from 98:2 to 88:12 are often referred to as poly(phthalate-carbonate)s (PPC).

In another embodiment, a specific polycarbonate copolymer is a poly(carbonate)-co-(monoaryl arylate ester) containing carbonate units (1) and repeating monoaryl arylate ester units of formula (7b)

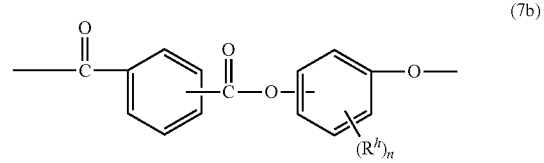
(7b)

wherein each $R^h$ is independently a halogen atom, a $C_{1-10}$ hydrocarbyl such as a $C_{1-10}$ alkyl group, a halogen-substituted $C_{1-10}$ alkyl group, a $C_{6-10}$ aryl group, or a halogen-substituted $C_{6-10}$ aryl group, and n is 0 to 4. Specifically, each $R^h$ is independently a $C_{1-4}$ alkyl, and n is 0 to 3, 0 to 1, or 0. These poly(carbonate)-co-(monoaryl arylate ester) copolymers are of formula (8b)

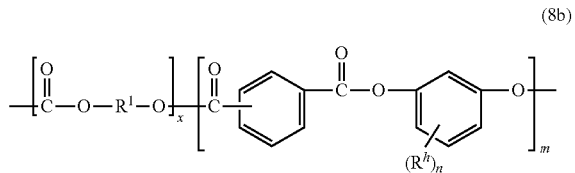
(8b)

wherein $R^1$ is as defined in formula (1) and $R^h$, and n are as defined in formula (7b), and the mole ratio of x:m is 99:1 to 50:50, specifically 95:5 to 55:45, or 90:10 to 60:40.

Specifically, the monoaryl-arylate ester unit (7b) is derived from the reaction of a combination of isophthalic and terephthalic diacids (or derivatives thereof) with resorcinol (or reactive derivatives thereof) to provide isophthalate-terephthalate-resorcinol ("ITR" ester units) of formula (7c)

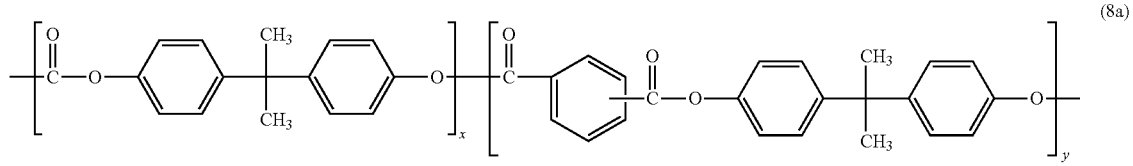
(8a)

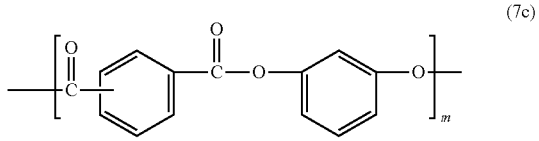

(7c)

wherein m is 4 to 100, 4 to 90, 5 to 70, more specifically 5 to 50, or still more specifically 10 to 30. In an embodiment, the ITR ester units are present in the polyester carbonate copolymer in an amount greater than or equal to 95 mol %, specifically greater than or equal to 99 mol %, and still more specifically greater than or equal to 99.5 mol % based on the total moles of ester units in the copolymer. Such (isophthalate-terephthalate-resorcinol)-carbonate copolymers ("ITR-PC") can possess many desired features, including toughness, transparency, and weatherability. ITR-PC copolymers can also have desirable thermal flow properties. In addition, ITR-PC copolymers can be readily manufactured on a commercial scale using interfacial polymerization techniques, which allow synthetic flexibility and composition specificity in the synthesis of the ITR-PC copolymers.

A specific example of a poly(carbonate)-co-(monoaryl arylate ester) is a poly(bisphenol A carbonate)-co-(isophthalate-terephthalate-resorcinol ester) of formula (8c)

wherein, in the foregoing formulae, $R^h$ is each independently a $C_{1-10}$ hydrocarbon group, n is 0 to 4, $R^a$ and $R^b$ are each independently a $C_{1-12}$ alkyl, p and q are each independently integers of 0 to 4, and $X^a$ is a single bond, —O—, —S—, —S(O)—, —S(O)$_2$—, —C(O)—, or a $C_{1-13}$ alkylidene of formula —C($R_c$)($R_d$)— wherein $R_c$ and $R_d$ are each independently hydrogen or $C_{1-12}$ alkyl, or a group of the formula —C(=$R_e$)— wherein $R_e$ is a divalent $C_{1-12}$ hydrocarbon group. The bisphenol ester units can be bisphenol A phthalate ester units of the formula

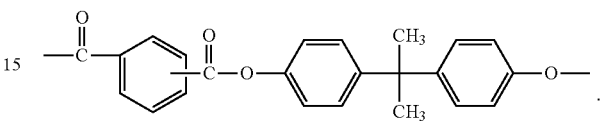

In an embodiment, poly(bisphenol A carbonate)-co-(isophthalate-terephthalate-resorcinol ester) (8c) comprises 1 to 20 mol % of bisphenol A carbonate units, 20-98 mol % of isophthalic acid-terephthalic acid-resorcinol ester units, and optionally 1 to 60 mol % of resorcinol carbonate units, isophthalic acid-terephthalic acid-bisphenol A phthalate ester units, or a combination thereof.

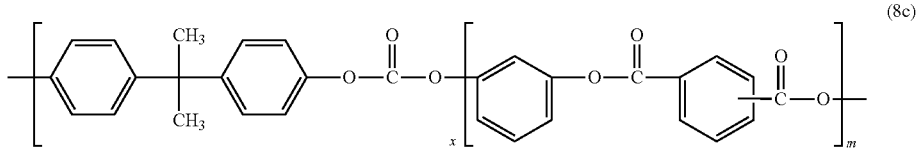

(8c)

wherein m is 4 to 100, 4 to 90, 5 to 70, more specifically 5 to 50, or still more specifically 10 to 30, and the mole ratio of x:m is 99:1 to 50:50, specifically 95:5 to 55:45, or 90:10 to 60:40. The ITR ester units are present in the poly (carbonate-arylate ester) copolymer in an amount greater than or equal to 95 mol %, specifically greater than or equal to 99 mol %, and still more specifically greater than or equal to 99.5 mol % based on the total moles of ester units. Other carbonate units, other ester units, or a combination thereof can be present, in a total amount of 1 to 20 mole % based on the total moles of units in the copolymers, for example resorcinol carbonate units of formula (20) and bisphenol ester units of formula (7a):

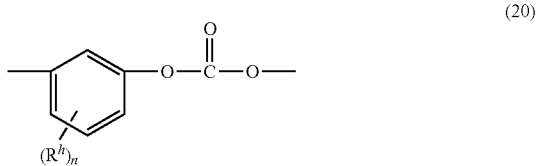

(20)

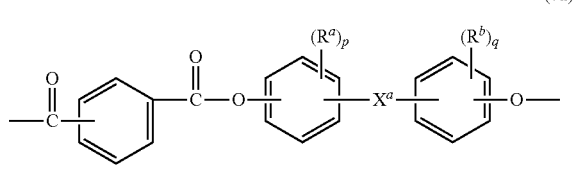

(7a)

Polyester carbonate copolymers are generally prepared from polyester blocks. The polyester blocks can also be prepared by interfacial polymerization. Rather than utilizing the dicarboxylic acid or diol per se, the reactive derivatives of the acid or diol, such as the corresponding acid halides, in particular the acid dichlorides and the acid dibromides can be used. Thus, for example instead of using isophthalic acid, terephthalic acid, or a combination comprising at least one of the foregoing acids, isophthaloyl dichloride, terephthaloyl dichloride, or a combination comprising at least one of the foregoing dichlorides can be used. The polyesters can also be obtained by melt-process condensation as described herein, by solution phase condensation, or by transesterification polymerization wherein, for example, a dialkyl ester such as dimethyl terephthalate can be transesterified with the dihydroxy reactant using acid catalysis, to generate the polyester blocks. Branched polyester blocks, in which a branching agent, for example, a glycol having three or more hydroxyl groups or a trifunctional or multifunctional carboxylic acid has been incorporated, can be used. Furthermore, it can be desirable to have various concentrations of acid and hydroxyl end groups on the polyester blocks, depending on the ultimate end use of the composition.

The polyester carbonate copolymer can have a weight average molecular weight ($M_w$) of 2,000 to 100,000 g/mol, specifically 3,000 to 75,000 g/mol, more specifically 4,000 to 50,000 g/mol, more specifically 5,000 to 35,000 g/mol, and still more specifically 17,000 to 30,000 g/mol. Molecular weight determinations are performed using GPC using a cross linked styrene-divinyl benzene column, at a sample concentration of 1 milligram per milliliter, and as calibrated with polycarbonate standards. Samples are eluted at a flow rate of 1.0 ml/min with methylene chloride as the eluent.

The polyester carbonate copolymer is present in an amount of 10 to 50 weight percent, or, 12 to 48 weight percent, or, 15 to 45 weight percent, based on the combined amounts of polycarbonate, polyester carbonate copolymer, poly(ethylene terephthalate), poly(butylene terephthalate) and optional impact modifier.

Polycarbonates and polyester carbonates can be manufactured by processes such as interfacial polymerization and melt polymerization. Although the reaction conditions for interfacial polymerization can vary, an exemplary process generally involves dissolving or dispersing a dihydroxy compound in aqueous NaOH or KOH, adding the resulting mixture to a water-immiscible solvent, and contacting the reactants with a carbonate precursor in the presence of a catalyst such as, for example, a tertiary amine or a phase transfer catalyst, under controlled pH conditions, e.g., 8 to 10.

The water-immiscible solvent can be, for example, methylene chloride, 1,2-dichloroethane, chlorobenzene, toluene, and the like.

Exemplary carbonate precursors include a carbonyl halide such as carbonyl bromide or carbonyl chloride (phosgene) a bishaloformate of a dihydroxy compound (e.g., the bischloroformate of bisphenol A, hydroquinone ethylene glycol, neopentyl glycol, or the like), and diaryl carbonates. Combinations comprising at least one of the foregoing types of carbonate precursors can also be used. The diaryl carbonate ester can be diphenyl carbonate, or an activated diphenyl carbonate having electron-withdrawing substituents on the each aryl, such as bis(4-nitrophenyl)carbonate, bis(2-chlorophenyl)carbonate, bis(4-chlorophenyl)carbonate, bis (methyl salicyl)carbonate, bis(4-methylcarboxylphenyl) carbonate, bis(2-acetylphenyl) carboxylate, bis(4-acetylphenyl) carboxylate, or a combination comprising at least one of the foregoing.

In the manufacture of polyester carbonates by interfacial polymerization, rather than using the dicarboxylic acid or diol directly, the reactive derivatives of the diacid or diol, such as the corresponding acid halides, in particular the acid dichlorides and the acid dibromides can be used. Thus, for example instead of using isophthalic acid, terephthalic acid, or a combination comprising at least one of the foregoing acids, isophthaloyl dichloride, terephthaloyl dichloride, or a combination comprising at least one of the foregoing dichlorides can be used.

Among tertiary amines that can be used as catalysts in interfacial polymerization are aliphatic tertiary amines such as triethylamine and tributylamine, cycloaliphatic tertiary amines such as N,N-diethyl-cyclohexylamine, and aromatic tertiary amines such as N,N-dimethylaniline. Among the phase transfer catalysts that can be used are catalysts of the formula $(R^3)_4Q^+X$, wherein each $R^3$ is the same or different, and is a $C_{1-10}$ alkyl; Q is a nitrogen or phosphorus atom; and X is a halogen atom or a $C_{1-8}$ alkoxy or $C_{6-18}$ aryloxy. Exemplary phase transfer catalysts include $(CH_3(CH_2)_3)_4$NX, $(CH_3(CH_2)_3)_4$PX, $(CH_3(CH_2)_5)_4$NX, $(CH_3(CH_2)_6)_4$NX, $(CH_3(CH_2)_4)_4$NX, $CH_3(CH_3(CH_2)_3)_3$NX, and $CH_3(CH_3(CH_2)_2)_3$NX, wherein X is $Cl^-$, $Br^-$, a $C_{1-8}$ alkoxy or a $C_{6-18}$ aryloxy. An effective amount of a phase transfer catalyst can be 0.1 to 10 wt %, or 0.5 to 2 wt %, each based on the weight of dihydroxy compound in the phosgenation mixture.

Alternatively, melt processes can be used to make the polycarbonates and polyester carbonate copolymers. In the melt polymerization process, polycarbonates can generally be prepared by co-reacting, in a molten state, a dihydroxy reactant as described above and a diaryl carbonate ester as described above in the presence of a transesterification catalyst. Conditions for melt process are described, for example, in WO2013/027165 and the references cited therein. Catalysts used in the melt polymerization can include an alpha catalyst and a beta catalyst. Alpha catalysts can comprise a source of alkali or alkaline earth ions and are typically more thermally stable and less volatile than beta catalysts. Beta catalysts are typically volatile and degrade at elevated temperatures, and can comprise a tranesterification catalyst of the formula $(R^3)_4Q^+X$ as described above. Beta catalysts are therefore preferred for use at early low-temperature polymerization stages. The alpha catalyst can be used in an amount sufficient to provide $1\times10^{-2}$ to $1\times10^{-8}$ moles, specifically, $1\times10^{-4}$ to $1\times10^{-7}$ moles of metal per mole of the dihydroxy compounds used. The amount of beta catalyst (e.g., organic ammonium or phosphonium salts) can be $1\times10^{-2}$ to $1\times10^{-5}$, specifically $1\times10^{-3}$ to $1\times10^{-4}$ moles per total mole of the dihydroxy compounds in the reaction mixture. Quenching of the transesterification catalysts and any reactive catalysts residues with an acidic compound after polymerization is completed can also be useful in some melt polymerization processes. Among the many quenchers that can be used are alkyl sulfonic esters of the formula $R^8SO_3R^9$ wherein $R^8$ is hydrogen, $C_1$-$C_{12}$ alkyl, $C_6$-$C_{18}$ aryl, or $C_7$-$C_{19}$ alkylaryl, and $R^9$ is $C_1$-$C_{12}$ alkyl, $C_6$-$C_{18}$ aryl, or $C_7$-$C_{19}$ alkylaryl (e.g., benzenesulfonate, p-toluenesulfonate, methylbenzene sulfonate, ethylbenzene sulfonate, n-butyl benzenesulfonate, octyl benzenesulfonate and phenyl benzenesulfonate, methyl p-toluenesulfonate, ethyl p-toluenesulfonate, n-butyl p-toluene sulfonate, octyl p-toluenesulfonate and phenyl p-toluenesulfonate, in particular alkyl tosylates such as n-butyl tosylate.)

An end-capping agent (also referred to as a chain stopper agent or chain terminating agent) can be included during polymerization to provide end groups. The end-capping agent (and thus end groups) are selected based on the desired properties of the polycarbonates. Exemplary end-capping agents are exemplified by monocyclic phenols such as phenol and $C_1$-$C_{22}$ alkyl-substituted phenols such as p-cumyl-phenol, resorcinol monobenzoate, and p- and tertiary-butyl phenol, monoethers of diphenols, such as p-methoxyphenol, and alkyl-substituted phenols with branched chain alkyl substituents having 8 to 9 carbon atoms, 4-substituted-2-hydroxybenzophenones and their derivatives, aryl salicylates, monoesters of diphenols such as resorcinol monobenzoate, 2-(2-hydroxyaryl)-benzotriazoles and their derivatives, 2-(2-hydroxyaryl)-1,3,5-triazines and their derivatives, mono-carboxylic acid chlorides such as benzoyl chloride, $C_1$-$C_{22}$ alkyl-substituted benzoyl chloride, toluoyl chloride, bromobenzoyl chloride, cinnamoyl chloride, and 4-nadimidobenzoyl chloride, polycyclic, mono-carboxylic acid chlorides such as trimellitic anhydride chloride, and naphthoyl chloride, functionalized chlorides of aliphatic monocarboxylic acids, such as acryloyl chloride and methacryoyl chloride, and mono-chloroformates such as phenyl chloroformate, alkyl-substituted phenyl chloroformates, p-cumyl phenyl chloroformate, and toluene chloroformate. Combinations of different end groups can be used.

Branched polycarbonate blocks can be prepared by adding a branching agent during polymerization. These branching agents include polyfunctional organic compounds containing at least three functional groups selected from hydroxyl, carboxyl, carboxylic anhydride, haloformyl, and mixtures of the foregoing functional groups. Specific examples include trimellitic acid, trimellitic anhydride, trimellitic trichloride, tris-p-hydroxyphenylethane, isatin-bisphenol, tris-phenol TC (1,3,5-tris((p-hydroxyphenyl)isopropyl)benzene), tris-phenol PA (4(4(1,1-bis(p-hydroxyphenyl)-ethyl) alpha, alpha-dimethyl benzyl) phenol), 4-chloroformyl phthalic anhydride, trimesic acid, and benzophenone tetracarboxylic acid. The branching agents can be added at a level of 0.05 to 2.0 wt. %. Combinations comprising linear polycarbonates and branched polycarbonates can be used.

The thermoplastic composition further comprises two polyesters, poly(ethylene terephthalate) (PET) and poly(1, 4-butylene terephthalate) (PBT). The polyesters can be obtained by interfacial polymerization or melt-process condensation as described above, by solution phase condensation, or by transesterification polymerization wherein, for example, a dialkyl ester such as dimethyl terephthalate can be transesterified with ethylene glycol using acid catalysis, to generate poly(ethylene terephthalate). A branched polyester, in which a branching agent, for example, a glycol having three or more hydroxyl groups or a trifunctional or multifunctional carboxylic acid has been incorporated, can be used.

The poly(ethylene terephthalate) has a weight average molecular weight of 50,000 to 150,000 g/mol, or 60,000 to 120,000 g/mol, or 70,000 to 100,000 g/mol, as determined by gel permeation chromatography using polystyrene standards. The poly(ethylene terephthalate) is present in an amount of 5 to 20 weight percent, or, 7 to 18 weight percent, or, 9 to 15 weight percent, based on the combined amounts of polycarbonate, polyester carbonate copolymer, poly(ethylene terephthalate), poly(butylene terephthalate) and optional impact modifier. The poly(ethylene terephthalate) may for example be a poly(ethylene terephthalate) comprising polymeric units derived from ethylene glycol and terephthalic acid or an ester thereof such as dimethyl terephthalate. Preferably, the poly(ethylene terephthalate) is a poly(ethylene terephthalate) homopolymer comprising polymeric units derived from ethylene glycol and terephthalic acid or an ester thereof such as dimethyl terephthalate.

The poly(butylene terephthalate) has a weight average molecular weight of 60,000 to 150,000 g/mol, or 70,000 to 140,000 g/mol, or 80,000 to 130,000 g/mol, as determined by gel permeation chromatography using polystyrene standards. The poly(butylene terephthalate) is present in an amount of 20 to 50 weight percent, or, 25 to 45 weight percent, or, 30 to 40 weight percent, based on the combined amounts of polycarbonate, polyester carbonate copolymer, poly(ethylene terephthalate), poly(butylene terephthalate) and optional impact modifier. The poly(butylene terephthalate) may for example be a poly(butylene terephthalate) comprising polymeric units derived from 1,4-butanediol and terephthalic acid or an ester thereof such as dimethyl terephthalate. Preferably, the poly(butylene terephthalate) is a poly(butylene terephthalate) homopolymer comprising polymeric units derived from 1,4-butanediol and terephthalic acid or an ester thereof such as dimethyl terephthalate.

In some embodiments the combined amounts of poly(ethylene terephthalate) and poly(butylene terephthalate) is 30 to 50 weight percent, or, 40 to 50 weight percent, based on the combined amounts of the polycarbonate, polyester carbonate copolymer, poly(ethylene terephthalate), poly(butylene terephthalate) and optional impact modifier.

The thermoplastic composition can further include impact modifier(s). Suitable impact modifiers are typically high molecular weight elastomeric materials derived from olefins, monovinyl aromatic monomers, acrylic and methacrylic acids and their ester derivatives, as well as conjugated dienes. The polymers formed from conjugated dienes can be fully or partially hydrogenated. The elastomeric materials can be in the form of homopolymers or copolymers, including random, block, radial block, graft, and core-shell copolymers. Combinations of impact modifiers can be used.

A specific type of impact modifier is an elastomer-modified graft copolymer comprising (i) an elastomeric (i.e., rubbery) polymer substrate having a Tg less than 10° C., more specifically less than −10° C., or more specifically −40° to −80° C., and (ii) a rigid polymeric superstrate grafted to the elastomeric polymer substrate. Materials suitable for use as the elastomeric phase include, for example, conjugated diene rubbers, for example polybutadiene and polyisoprene; copolymers of a conjugated diene with less than 50 wt. % of a copolymerizable monomer, for example a monovinylic compound such as styrene, acrylonitrile, n-butyl acrylate, or ethyl acrylate; olefin rubbers such as ethylene propylene copolymers (EPR) or ethylene-propylene-diene monomer rubbers (EPDM); ethylene-vinyl acetate rubbers; silicone rubbers; elastomeric $C_{1-8}$ alkyl (meth)acrylates; elastomeric copolymers of $C_{1-8}$ alkyl (meth)acrylates with butadiene and/or styrene; or combinations comprising at least one of the foregoing elastomers. Materials suitable for use as the rigid phase include, for example, monovinyl aromatic monomers such as styrene and alpha-methyl styrene, and monovinylic monomers such as acrylonitrile, acrylic acid, methacrylic acid, and the $C_1$-$C_6$ esters of acrylic acid and methacrylic acid, specifically methyl methacrylate.

Specific elastomer-modified graft copolymers include those formed from styrene-butadiene-styrene (SBS), styrene-butadiene rubber (SBR), styrene-ethylene-butadiene-styrene (SEBS), ABS (acrylonitrile-butadiene-styrene), acrylonitrile-ethylene-propylene-diene-styrene (AES), styrene-isoprene-styrene (SIS), and methyl methacrylate-butadiene-styrene (MBS). In some embodiments the impact modifier is methyl methacrylate-butadiene-styrene (MBS), acrylonitrile-butadiene-styrene (ABS), acrylonitrile-styrene-butyl acrylate (ASA), or a combination thereof.

The optional impact modifier can be present in an amount up to 30 weight percent, based on the combined amounts of polycarbonate, polyester carbonate copolymer, poly(ethylene terephthalate), poly(butylene terephthalate) and optional impact modifier. Impact modifier(s) are generally present in amounts of 5 to 20 weight percent, or, 5 to 10 weight percent, based on the combined amounts of polycarbonate, polyester carbonate copolymer, poly(ethylene terephthalate), poly(butylene terephthalate) and optional impact modifier.

In some embodiments, the composition has a rubber content of 4 to 15 weight percent, or, 5 to 10 weight percent, based on the combined amounts of polycarbonate, polyester carbonate copolymer, poly(ethylene terephthalate), poly(butylene terephthalate) and optional impact modifier. The rubber content comprises the elastomeric (i.e., rubbery) polymer substrate of the impact modifier.

The thermoplastic composition can include various additives ordinarily incorporated into polymer compositions of this type, with the proviso that the additive(s) are selected so as to not significantly adversely affect the desired properties of the thermoplastic composition, in particular the heat resistance. Such additives can be mixed at a suitable time during the mixing of the components for forming the composition. Additives include fillers, reinforcing agents, antioxidants, heat stabilizers, light stabilizers, ultraviolet (UV) light stabilizers, plasticizers, lubricants, mold release agents, antistatic agents, colorants such as such as titanium dioxide, carbon black, and organic dyes, surface effect additives, radiation stabilizers, flame retardants, nucleating agents, phosphorus containing acidic compounds, and anti-drip agents. Exemplary nucleating agents include talc, carbon black, phthalocyanines, saccharine, sodium benzoate, and combinations comprising one or more of the foregoing. Some nucleating agents can also functions as colorants. Exemplary phosphorous containing acidic compounds include phosphorous acid ($H_3PO_3$), phosphoric acid ($H_3PO_4$) and mono zinc phosphate. A combination of additives can be used, for example a combination of ultraviolet (UV) light stabilizer, antioxidants, a phosphorus containing acidic compound, and nucleating agent. In general, the additives are used in the amounts generally known to be effective. For example, the total amount of the additives (other than any filler, or reinforcing agents) can be 0.01 to 5 wt. %, based on the total weight of the polycarbonate composition.

In some embodiments, the thermoplastic composition has a Vicat softening point greater than or equal to 100 degrees Celsius, or greater than or equal to 110 degrees Celsius as determined by ISO-306 B120 at a load of 50N and a speed of 120° C./hr.

In some embodiments, the thermoplastic composition has a heat distortion temperature greater than or equal to 90 degrees Celsius as determined by ISO 75 flatwise at a load of 0.45 MPa.

In some embodiments the thermoplastic composition comprises 10 to 30 weight percent of a polycarbonate; 15 to 25 weight percent of a polyester carbonate copolymer; 8 to 16 weight percent of a poly(ethylene terephthalate); 30 to 40 weight percent of a poly(butylene terephthalate); a nucleating agent, a phosphorus containing acidic compound, and 7 to 15 weight percent of an impact modifier wherein weight percent is based on the combined amounts of polycarbonate, polyester carbonate copolymer, poly(ethylene terephthalate), poly(butylene terephthalate) and optional impact modifier.

In a particular embodiment, the thermoplastic composition according to the present invention comprises:
  5 to 40 weight percent of a polycarbonate;
  15 to 45 weight percent of a polyester carbonate copolymer;
  9-15 weight percent of a poly(ethylene terephthalate);
  25 to 45 weight percent of a poly(butylene terephthalate); and
  5 to 10 weight percent of an impact modifier; wherein weight percent is based on the combined amounts of polycarbonate, polyester carbonate copolymer, poly(ethylene terephthalate) poly(butylene terephthalate) and impact modifier.

In a further particular embodiment, the thermoplastic composition according to the present invention comprises:
  5 to 40 weight percent of a polycarbonate;
  15 to 45 weight percent of a polyester carbonate copolymer;
  9-15 weight percent of a poly(ethylene terephthalate);
  25 to 45 weight percent of a poly(butylene terephthalate); and
  5 to 10 weight percent of an impact modifier; wherein weight percent is based on the combined amounts of polycarbonate, polyester carbonate copolymer, poly(ethylene terephthalate) poly(butylene terephthalate) and impact modifier; and wherein the impact modifier is methyl methacrylate-butadiene-styrene (MBS), acrylonitrile-butadiene-styrene (ABS), acrylonitrile-styrene-butylacrylate (ASA), or a combination thereof.

In another particular embodiment, the thermoplastic composition according to the present invention comprises:
  5 to 40 weight percent of a polycarbonate having a weight average molecular weight of 15,000 to 40,000 g/mol when determined using gel permeation chromatography with polycarbonate standards;
  15 to 45 weight percent of a polyester carbonate copolymer;
  9-15 weight percent of a poly(ethylene terephthalate);
  25 to 45 weight percent of a poly(butylene terephthalate); and
  5 to 10 weight percent of an impact modifier; wherein weight percent is based on the combined amounts of polycarbonate, polyester carbonate copolymer, poly(ethylene terephthalate) poly(butylene terephthalate) and impact modifier; and wherein the impact modifier is methyl methacrylate-butadiene-styrene (MBS), acrylonitrile-butadiene-styrene (ABS), acrylonitrile-styrene-butylacrylate (ASA), or a combination thereof.

In yet another particular embodiment, the thermoplastic composition according to the present invention comprises:
  5 to 40 weight percent of a polycarbonate;
  15 to 45 weight percent of a polyester carbonate copolymer;
  9-15 weight percent of a poly(ethylene terephthalate);
  25 to 45 weight percent of a poly(butylene terephthalate) having a weight average molecular weight of 80,000 to 130,000 g/mol as determined by gel permeation chromatography using polystyrene standards; and
  5 to 10 weight percent of an impact modifier; wherein weight percent is based on the combined amounts of polycarbonate, polyester carbonate copolymer, poly(ethylene terephthalate) poly(butylene terephthalate) and impact modifier; and wherein the impact modifier is methyl methacrylate-butadiene-styrene (MBS), acrylonitrile-butadiene-styrene (ABS), acrylonitrile-styrene-butylacrylate (ASA), or a combination thereof.

In yet another further particular embodiment, the thermoplastic composition according to the present invention comprises:
  5 to 40 weight percent of a polycarbonate comprising polymeric units comprising moieties derived from bisphenol-A;
  15 to 45 weight percent of a polyester carbonate copolymer;
  9-15 weight percent of a poly(ethylene terephthalate);
  25 to 45 weight percent of a poly(butylene terephthalate) having a weight average molecular weight of 80,000 to 130,000 g/mol as determined by gel permeation chromatography using polystyrene standards; and
  5 to 10 weight percent of an impact modifier; wherein weight percent is based on the combined amounts of polycarbonate, polyester carbonate copolymer, poly(ethylene terephthalate) poly(butylene terephthalate) and impact modifier; and wherein the impact modifier is methyl methacrylate-butadiene-styrene (MBS), acrylonitrile-butadiene-styrene (ABS), acrylonitrile-styrene-butylacrylate (ASA), or a combination thereof.

In yet another particular embodiment, the thermoplastic composition according to the present invention comprises:
  5 to 40 weight percent of a polycarbonate;
  15 to 45 weight percent of a polyester carbonate copolymer comprising polymeric units comprising moieties derived from bisphenol A and moieties derived from terephthalic acid or dimethyl terephthalate;

9-15 weight percent of a poly(ethylene terephthalate);

25 to 45 weight percent of a poly(butylene terephthalate) having a weight average molecular weight of 80,000 to 130,000 g/mol as determined by gel permeation chromatography using polystyrene standards; and 5 to 10 weight percent of an impact modifier; wherein weight percent is based on the combined amounts of polycarbonate, polyester carbonate copolymer, poly(ethylene terephthalate) poly(butylene terephthalate) and impact modifier; and wherein the impact modifier is methyl methacrylate-butadiene-styrene (MBS), acrylonitrile-butadiene-styrene (ABS), acrylonitrile-styrene-butylacrylate (ASA), or a combination thereof.

In yet another further particular embodiment, the thermoplastic composition according to the present invention comprises:

5 to 40 weight percent of a polycarbonate comprising polymeric units comprising moieties derived from bisphenol-A;

15 to 45 weight percent of a polyester carbonate copolymer comprising polymeric units comprising moieties derived from bisphenol A and moieties derived from terephthalic acid or dimethyl terephthalate;

9-15 weight percent of a poly(ethylene terephthalate);

25 to 45 weight percent of a poly(butylene terephthalate) having a weight average molecular weight of 80,000 to 130,000 g/mol as determined by gel permeation chromatography using polystyrene standards; and 5 to 10 weight percent of an impact modifier; wherein weight percent is based on the combined amounts of polycarbonate, polyester carbonate copolymer, poly(ethylene terephthalate) poly(butylene terephthalate) and impact modifier; and wherein the impact modifier is methyl methacrylate-butadiene-styrene (MBS), acrylonitrile-butadiene-styrene (ABS), acrylonitrile-styrene-butylacrylate (ASA), or a combination thereof.

The compositions can be manufactured by various methods known in the art. For example, polycarbonate, polyester carbonate copolymer, poly(butylene terephthalate), poly(ethylene terephthalate), and other optional components are first blended, optionally with any fillers, in a high speed mixer or by hand mixing. The blend is then fed into the throat of a twin-screw extruder via a hopper. Alternatively, at least one of the components can be incorporated into the composition by feeding it directly into the extruder at the throat and/or downstream through a sidestuffer, or by being compounded into a masterbatch with a desired polymer and fed into the extruder. The extruder is generally operated at a temperature higher than that necessary to cause the composition to flow. The extrudate can be immediately quenched in a water bath and pelletized. The pellets so prepared can be one-fourth inch long or less as desired. Such pellets can be used for subsequent molding, shaping, or forming.

Shaped, formed, or molded articles comprising the compositions are also provided. The compositions can be molded into useful shaped articles by a variety of methods, such as injection molding, extrusion, rotational molding, blow molding and thermoforming. Some example of articles include automotive and vehicular body panels such as bumper covers and bumpers.

The thermoplastic compositions are further illustrated by the following non-limiting examples.

EXAMPLES

The following components are used in the examples. The weight average molecular weight for the polycarbonates was determined using gel permeation chromatography with polycarbonate standards. The weight average molecular weight for the poly(butylene terephthalate) and poly(ethylene terephthalate) were determined using gel permeation chromatography with polystyrene standards. Unless specifically indicated otherwise, the amount of each component is in weight percent in the following examples, based on the total weight of the composition.

| Acronym | Description | Source |
|---|---|---|
| PC-1 | A bisphenol A polycarbonate having a weight average molecular weight of 30,000 to 31,000 g/mol | SABIC Lexan 105 |
| PC-2 | A bisphenol A polycarbonate having a weight average molecular weight of 21,000 to 22,000 g/mol | SABIC, Lexan 175 |
| PPC | A poly(phthalate-carbonate) | SABIC Lexan PPC |
| ITR-PC 1 | BPA-ITR copolycarbonate (20 mol-% ITR, Mw = 30,000 to 31,000 g/mol) | SABIC |
| ITR-PC 2 | BPA-ITR copolycarbonate (90 mol-% ITR, Mw = 19,000 to 21,000 g/mol) | SABIC |
| PBT-1 | Poly(butylene terephthalate) having a weight average molecular weight of 120,000 g/mol (milled) | Smile Plastics PBT 315 |
| PBT-2 | Poly(butylene terephthalate) having a weight average molecular weight of 70,000 g/mol (milled) | Smile Plastics PBT 195 |
| PET | Poly(ethylene terephthalate) having a weight average molecular weight of 85,000 g/mol (milled) | Smile Plastics Melinar B90S |
| MBS | Methacrylate-butadiene-styrene copolymer | Rohm & Haas Paraloid EXL2650A |
| UVA 235 | 2-(2-hydroxy-5-t-octylphenyl) benzotriazole | Hunan UV5411 |
| Colorants | A combination of titanium dioxide, carbon black, ferrous oxide and chromium antimony titanium oxide | |
| Additives | A combination of pentaerythritol tetrastearate (PETS), $H_3PO_3$, and pentaerythritol tetrakis(3,5-di-t-butyl-4-hydroxycinnamate) (AO 1010) | |
| Talc | | Luzenac Jetfine 3CA |

The examples were made by melt mixing the materials in a 25 mm zoned twin screw extruder. All components were dry-mixed mixed and added at the throat of the extruder. The composition was pelletized after exiting the die head. The compositions were then tested for Vicat B120 softening point according to ISO 306 at a load of 50N and a speed of 120° C./hr, heat deformation temperature (HDT) according to ISO 75 flatwise at a load of 0.45 MPa. The data for Vicat softening point and HDT are both expressed in degrees Celsius. The Vicat softening point data has a standard deviation of 0.64 degrees Celsius. The HDT data has a standard deviation of 0.58 degrees Celsius.

Comparative Examples 1-4

Comparative Example 1 demonstrates the Vicat and HDT values of a composition in the absence of polyester carbonate. Comparative Examples 2, 3 and 4 show that with the introduction of polyester carbonate the Vicat and HDT values decrease while the 60 degree gloss retention increases significantly. The comparative examples in Table 1 show that introducing polyester carbonate into a polycarbonate/poly(butylene terephthalate) blend improves weathering, but reduces the heat resistance. This heat reduction is even observed in presence of colorants, which can act as a nucleating agents and increase the heat resistance. The amounts in Table 1 are in weight percent based on the total weight of the composition. The compositions were also tested for 60 degree gloss retention after weathering according to ISO 4892-2A for 3000 hours. The 60 degree gloss retention data is expressed in percent (%). In Comparative Examples 1 through 4, the total amount of components, with the exception of colorant, equals 100 weight percent. The amount of colorant is based on the total weight of the other components.

TABLE 1

|         | C-Ex. 1 | C-Ex. 2 | C-Ex. 3 | C-Ex. 4 |
|---------|---------|---------|---------|---------|
| PC-1    | 26.135  | 21.135  | 11.135  | —       |
| PC-2    | 26.135  | 21.135  | 11.135  | —       |
| PPC     | —       | 10      | 30      | 52.27   |
| PBT-1   | 26      | 26      | 26      | 26      |
| PBT-2   | 14      | 14      | 14      | 14      |
| MBS     | 7       | 7       | 7       | 7       |
| UVA 235 | 0.25    | 0.25    | 0.25    | 0.25    | also replacement of poly(butylene terephthalate) with poly (ethylene terephthalate) is a very effective method to increase heat resistance. Replacement of only 6% poly (butylene terephthalate) with 6% poly(ethylene terephthalate) gives an increase by as much as 20.7° C. in Vicat softening temperature and 16.2° C. in HDT. Addition of more than 18% poly(ethylene terephthalate) (Ex. 8) can lead to a reduction in heat resistance as compared to lower poly(ethylene terephthalate) level (Ex. 7). Comparison with the reference sample without polyester carbonate (C-Ex. 5) shows that the loss in heat resistance upon polyester carbonate addition can almost fully be compensated. The ΔVicat and ΔHDT values are the change in Vicat or HDT with the replacement of a portion of the polycarbonate with polyethylene terephthalate. The ΔVicat per wt % PET is the ΔVicat divided by the wt % PET. Similarly, ΔHDT per wt % PET is the ΔHDT divided by the wt % PET. For instance, Examples 4-8 are compared to Comparative Example 8, Examples 2-3 are compared to Comparative Example 7 and Example 1 is compared to Comparative Example 6.

TABLE 2

|                  | C-Ex. 5 | C-Ex. 6 | Ex. 1 | C-Ex. 7 | Ex. 2 | Ex. 3 | C-Ex. 8 | Ex. 4 | Ex. 5 | Ex. 6 | Ex. 7 | Ex. 8 |
|------------------|---------|---------|-------|---------|-------|-------|---------|-------|-------|-------|-------|-------|
| PC-1             | 20      | —       | —     | —       | —     | —     | —       | —     | —     | —     | —     | —     |
| PC-2             | 31.97   | 31.97   | 25.97 | 37.97   | 31.97 | 25.97 | 43.97   | 40.97 | 37.97 | 34.97 | 31.97 | 25.97 |
| PPC              | —       | 20      | 20    | 20      | 20    | 20    | 20      | 20    | 20    | 20    | 20    | 20    |
| PBT-1            | 26      | 26      | 26    | 22      | 22    | 22    | 18      | 18    | 18    | 18    | 18    | 18    |
| PBT-2            | 14      | 14      | 14    | 12      | 12    | 12    | 10      | 10    | 10    | 10    | 10    | 10    |
| PET              | —       | —       | 6     | —       | 6     | 12    | —       | 3     | 6     | 9     | 12    | 18    |
| MBS              | 7       | 7       | 7     | 7       | 7     | 7     | 7       | 7     | 7     | 7     | 7     | 7     |
| UVA 235          | 0.25    | 0.25    | 0.25  | 0.25    | 0.25  | 0.25  | 0.25    | 0.25  | 0.25  | 0.25  | 0.25  | 0.25  |
| Additives        | 0.78    | 0.78    | 0.78  | 0.78    | 0.78  | 0.78  | 0.78    | 0.78  | 0.78  | 0.78  | 0.78  | 0.78  |
| Vicat            | 115.8   | 84.5    | 109.1 | 90.5    | 105.2 | 110.9 | 98.2    | 103.3 | 106.6 | 109.3 | 111.3 | 113.4 |
| ΔVicat           | —       | —       | 24.6  | —       | 14.7  | 20.4  | —       | 5.1   | 8.3   | 11.1  | 13.1  | 15.2  |
| ΔVicat per wt % PET | —    | —       | 4.1   | —       | 2.5   | 1.7   | —       | 1.7   | 1.4   | 1.2   | 1.1   | 0.8   |
| HDT              | 100.6   | 74.8    | 90.5  | 81.8    | 91.0  | 95.8  | 88.5    | 90.2  | 93.8  | 97.8  | 99.2  | 97.1  |
| ΔHDT             | —       | —       | 15.7  | —       | 9.2   | 14.0  | —       | 1.7   | 5.3   | 9.3   | 10.7  | 8.6   |
| ΔHDT per wt % PET | —     | —       | 2.6   | —       | 1.5   | 1.2   | —       | 0.6   | 0.9   | 1.0   | 0.9   | 0.5   |

TABLE 1-continued

|                       | C-Ex. 1 | C-Ex. 2 | C-Ex. 3 | C-Ex. 4 |
|-----------------------|---------|---------|---------|---------|
| Additives             | 0.48    | 0.48    | 0.48    | 0.48    |
| Colorants             | 1.55    | 1.55    | 1.55    | 1.55    |
| Vicat                 | 125.3   | 123.2   | 101.2   | 93.2    |
| HDT                   | 112.3   | 109.4   | 85.4    | 83.2    |
| 60 degree gloss retention | 4   | 34      | 81      | 94      |

Comparative Examples 5-8 and Examples 1-8

Table 2 shows that addition of low levels poly(ethylene terephthalate) leads to a considerable increase in heat resistance. When comparing to the reference sample without poly(ethylene terephthalate), the increase can be as high as 24.6° C. for Vicat and 15.7° C. for HDT (Ex. 1 compared to C-Ex 6). When comparing C-Ex 13 to Ex 16 and Ex 22, which have the same total polyester content, it is clear that Comparative Examples 9-13 and Examples 9-18

Table 3 shows that addition of a nucleating agent (talc or a colorant such as TiO2 and carbon black) can further improve heat resistance. This is known in the art, but it is surprising to find that the heat improvement upon addition of poly(ethylene terephthalate) becomes also more effective in many cases, especially when looking at the change in HDT (ΔHDT). In this case, replacement of only 6% poly(butylene terephthalate) with 6% poly(ethylene terephthalate) (C-Ex. 10 and Ex. 10), leads to an increase of 14.9 degrees in Vicat and 19.6 degrees in HDT. Heat resistance improvement only seems effective up to 18 weight percent poly(ethylene terephthalate). The results for C-Ex. 13, Ex. 17 and Ex. 18 also show that chemical resistance is increased upon addition of poly(ethylene terephthalate). ESCR test is performed by placing ISO tensile bars in a 1% strain jig. The bars are covered with cloth drenched in Fuel C and wrapped in aluminum foil. Bars are left for 24 hrs in these conditions, cleaned and subjected to tensile testing (ISO 527, at 50 mm/min). The reported value is the tensile strength in MPa (after exposure).

TABLE 3

| | C-Ex. 9 | C-Ex. 10 | Ex. 9 | C-Ex. 11 | Ex. 10 | Ex. 11 | C-Ex. 12 | Ex. 12 |
|---|---|---|---|---|---|---|---|---|
| PC-1 | 20 | — | — | — | — | — | — | — |
| PC-2 | 31.87 | 31.87 | 25.87 | 37.87 | 31.87 | 25.87 | 43.87 | 40.87 |
| PPC | — | 20 | 20 | 20 | 20 | 20 | 20 | 20 |
| PBT-1 | 26 | 26 | 26 | 22 | 22 | 22 | 18 | 18 |
| PBT-2 | 14 | 14 | 14 | 12 | 12 | 12 | 10 | 10 |
| PET | — | — | 6 | — | 6 | 12 | — | 3 |
| MBS | 7 | 7 | 7 | 7 | 7 | 7 | 7 | 7 |
| UVA 235 | 0.25 | 0.25 | 0.25 | 0.25 | 0.25 | 0.25 | 0.25 | 0.25 |
| Additives | 0.78 | 0.78 | 0.78 | 0.78 | 0.78 | 0.78 | 0.78 | 0.78 |
| Talc | 0.1 | 0.1 | 0.1 | 0.1 | 0.1 | 0.1 | 0.1 | 0.1 |
| Colorants | — | — | — | — | — | — | — | — |
| Vicat | 122.2 | 100.9 | 118.0 | 93.3 | 115.8 | 118.8 | 99.8 | 109.2 |
| ΔVicat | — | — | 17.1 | — | 22.5 | 25.5 | — | 9.4 |
| HDT | 106.9 | 79.4 | 97.4 | 82.5 | 99.0 | 101.2 | 89.1 | 94.5 |
| ΔHDT | — | — | 18.0 | — | 16.5 | 18.7 | — | 5.4 |
| ESCR Fuel C | — | — | — | — | — | — | — | — |

| | Ex. 13 | Ex. 14 | Ex. 15 | Ex. 16 | C-Ex. 13 | Ex. 17 | Ex. 18 |
|---|---|---|---|---|---|---|---|
| PC-1 | — | — | — | — | — | — | — |
| PC-2 | 37.87 | 34.87 | 31.87 | 25.87 | 42.67 | 36.67 | 30.67 |
| PPC | 20 | 20 | 20 | 20 | 20 | 20 | 20 |
| PBT-1 | 18 | 18 | 18 | 18 | 18 | 18 | 18 |
| PBT-2 | 10 | 10 | 10 | 10 | 10 | 10 | 10 |
| PET | 6 | 9 | 12 | 18 | — | 6 | 12 |
| MBS | 7 | 7 | 7 | 7 | 7 | 7 | 7 |
| UVA 235 | 0.25 | 0.25 | 0.25 | 0.25 | — | — | — |
| Additives | 0.78 | 0.78 | 0.78 | 0.78 | 0.78 | 0.78 | 0.78 |
| Talc | 0.1 | 0.1 | 0.1 | 0.1 | — | — | — |
| Colorants | — | — | — | — | 1.55 | 1.55 | 1.55 |
| Vicat | 114.6 | 117.2 | 118.6 | 119.7 | 103.0 | 116.6 | 118.5 |
| ΔVicat | 14.9 | 17.4 | 18.9 | 20.0 | — | 13.6 | 15.5 |
| HDT | 98.9 | 101.8 | 103.3 | 102.1 | 90.6 | 102.5 | 102.9 |
| ΔHDT | 9.8 | 12.7 | 14.2 | 13.0 | — | 11.9 | 12.3 |
| ESCR Fuel C | — | — | — | — | 17.4 | 21.8 | 33.4 |

Comparative Examples 14-19

The comparative data in Table 4 shows that in absence of polyester carbonate only a small increase in heat resistance can be achieved. In the absence of polyester carbonate and poly(ethylene terephthalate) the inclusion of a nucleating agent results in an increase of approximately 6-7 degrees in the Vicat softening temperature (C Ex. 14 and 15 compared to C Ex 17 and 18). The inclusion of poly(ethylene terephthalate) results in an increase of 7.8 degrees in the Vicat softening temperature in the absence of a nucleating agent (see C Ex. 15 and C Ex 16). However, the inclusion of poly(ethylene terephthalate) in a composition with a nucleating agent and without polyester carbonate shows a less of an increase in Vicat softening temperate since the Vicat softening temperature only increases by 3.7 degrees (C. Ex. 18 and C Ex. 19). The combination of poly(ethylene terephthalate) and a nucleating agent have less of an impact on heat resistance in the absence of polyester carbonate than the combination does in the presence of polyester carbonate.

TABLE 4

| | C-Ex. 14 | C-Ex. 15 | C-Ex. 16 | C-Ex. 17 | C-Ex. 18 | C-Ex. 19 |
|---|---|---|---|---|---|---|
| PC-1 | 20 | 20 | 20 | 20 | 20 | 20 |
| PC-2 | 31.97 | 37.97 | 31.97 | 31.87 | 37.87 | 31.87 |
| PPC | | | | | | |
| PBT-1 | 26 | 22 | 22 | 26 | 22 | 22 |
| PBT-2 | 14 | 12 | 12 | 14 | 12 | 12 |
| PET | | | 6 | | | 6 |
| MBS | 7 | 7 | 7 | 7 | 7 | 7 |
| UVA 235 | 0.25 | 0.25 | 0.25 | 0.25 | 0.25 | 0.25 |
| Additives | 0.78 | 0.78 | 0.78 | 0.78 | 0.78 | 0.78 |
| Talc | | | | 0.1 | 0.1 | 0.1 |
| Vicat | 114.3 | 111.8 | 119.5 | 120.6 | 119.2 | 122.9 |
| ΔVicat | — | — | 7.8 | — | — | 3.7 |
| ΔVicat per wt-% PET | — | — | 1.3 | — | — | 0.6 |
| HDT | 99.1 | 104.8 | 106.9 | | | |
| ΔHDT | — | — | 2.1 | — | — | — |
| ΔHDT per wt-% PET | — | — | 0.3 | — | — | — |

Comparative Examples 20-22 and Examples 19-21

Table 5 shows the minimal effect of polycarbonate molecular weight on the Vicat softening temperature in the presence and absence of poly(ethylene terephthalate). The combination of a higher molecular weight polycarbonate with poly(ethylene terephthalate) shows the greatest increase in Vicat softening temperature.

TABLE 5

|        | C.Ex-20 | C.Ex-21 | C.Ex-22 | Ex-19  | Ex-20  | Ex-21  |
|--------|---------|---------|---------|--------|--------|--------|
| PC-1   | —       | 20.935  | 41.87   | —      | 15.935 | 31.87  |
| PC-2   | 41.87   | 20.935  | —       | 31.87  | 15.935 | —      |
| PPC    | 20      | 20      | 20      | 20     | 20     | 20     |
| PBT-1  | 15      | 15      | 15      | 15     | 15     | 15     |
| PBT-2  | 15      | 15      | 15      | 15     | 15     | 15     |
| PET    | —       | —       | —       | 10     | 10     | 10     |
| MBS    | 7       | 7       | 7       | 7      | 7      | 7      |
| UVA 235 | 0.25   | 0.25    | 0.25    | 0.25   | 0.25   | 0.25   |
| Additives | 0.78 | 0.78    | 0.78    | 0.78   | 0.78   | 0.78   |
| Talc   | 0.1     | 0.1     | 0.1     | 0.1    | 0.1    | 0.1    |
| Vicat  | 96.8    | 98.0    | 100.1   | 114.2  | 117.9  | 119.6  |
| ΔVicat | —       | —       | —       | 17.5   | 19.9   | 19.6   |
| ΔVicat per wt-% PET | — | — | —   | 1.7    | 2.0    | 2.0    |

Comparative Examples 23-25—and Examples 22-24

Table 6 shows the minimal effect of poly(butylene terephthalate) molecular weight on the Vicat softening temperature in the presence and absence of poly(ethylene terephthalate). The combination of a higher molecular weight poly(butylene terephthalate) with poly(ethylene terephthalate) shows the greatest increase in Vicat softening temperature.

TABLE 6

|        | C.Ex-23 | C.Ex-24 | C.Ex-25 | Ex.22  | Ex-23  | Ex-24  |
|--------|---------|---------|---------|--------|--------|--------|
| PC-2   | 41.87   | 41.87   | 41.87   | 31.87  | 31.87  | 31.87  |
| PPC    | 20      | 20      | 20      | 20     | 20     | 20     |
| PBT-1  | 30      | 15      |         | 30     | 15     |        |
| PBT-2  |         | 15      | 30      |        | 15     | 30     |
| PET    |         |         |         | 10     | 10     | 10     |
| MBS    | 7       | 7       | 7       | 7      | 7      | 7      |
| UVA 235 | 0.25   | 0.25    | 0.25    | 0.25   | 0.25   | 0.25   |
| Additives | 0.78 | 0.78    | 0.78    | 0.78   | 0.78   | 0.78   |
| Talc   | 0.1     | 0.1     | 0.1     | 0.1    | 0.1    | 0.1    |
| Vicat  | 100.8   | 96.8    | 95.7    | 119.8  | 114.2  | 108.4  |
| ΔVicat | —       | —       | —       | 19.0   | 17.5   | 12.7   |
| ΔVicat per wt-% PET | — | — | — | 1.9    | 1.7    | 1.3    |

Comparative Examples 26-33 and Examples 25-29

Table 7 shows the effect of differing amounts of polyester carbonate in combination with poly(ethylene terephthalate). The data indicates that the improvement in Vicat softening temperature is highest when the composition comprises 10-50 weight percent of polyester carbonate.

TABLE 7

|         | C.Ex-26 | C.Ex-27 | C.Ex-28 | C.Ex-29 | C.Ex-30 | C.Ex-31 | C.Ex-32 | C.Ex-33 | Ex.-26 | Ex-27 | Ex.28 | Ex.29 |
|---------|---------|---------|---------|---------|---------|---------|---------|---------|--------|-------|-------|-------|
| PC-2    | 61.87   | 56.87   | 51.87   | 41.87   | 31.87   | 11.87   | 51.87   | 46.87   | 41.87  | 31.87 | 21.87 | 1.87  |
| PPC     |         | 5       | 10      | 20      | 30      | 50      |         | 5       | 10     | 20    | 30    | 50    |
| PBT-1   | 15      | 15      | 15      | 15      | 15      | 15      | 15      | 15      | 15     | 15    | 15    | 15    |
| PBT-2   | 15      | 15      | 15      | 15      | 15      | 15      | 15      | 15      | 15     | 15    | 15    | 15    |
| PET     |         |         |         |         |         |         | 10      | 10      | 10     | 10    | 10    | 10    |
| MBS     | 7       | 7       | 7       | 7       | 7       | 7       | 7       | 7       | 7      | 7     | 7     | 7     |
| UVA 235 | 0.25    | 0.25    | 0.25    | 0.25    | 0.25    | 0.25    | 0.25    | 0.25    | 0.25   | 0.25  | 0.25  | 0.25  |
| Additives | 0.78  | 0.78    | 0.78    | 0.78    | 0.78    | 0.78    | 0.78    | 0.78    | 0.78   | 0.78  | 0.78  | 0.78  |
| Talc    | 0.1     | 0.1     | 0.1     | 0.1     | 0.1     | 0.1     | 0.1     | 0.1     | 0.1    | 0.1   | 0.1   | 0.1   |
| Vicat   | 113.7   | 112.8   | 105.7   | 96.8    | 97.9    | 102.0   | 121.6   | 121.6   | 120.0  | 114.2 | 109.3 | 112.8 |
| ΔVicat  | —       | —       | —       | —       | —       | —       | 7.8     | 8.8     | 14.3   | 17.5  | 11.4  | 10.8  |
| ΔVicat per wt-% PET | — | — | — | — | — | — | 0.8 | 0.9 | 1.4 | 1.7 | 1.1 | 1.1 |
| HDT     | 97.5    | 93.6    | 87.4    | 86.1    | 87.3    | 89.8    | 107.6   | 105.5   | 102.8  | 96.1  | 93.4  | 94.2  |
| ΔHDT    | —       | —       | —       | —       | —       | —       | 10.2    | 11.9    | 15.4   | 10.0  | 6.1   | 4.4   |
| ΔHDT per wt-% PET | — | — | — | — | — | — | 1.0 | 1.2 | 1.5 | 1.0 | 0.6 | 0.4 |

Comparative Examples 34-38 and Examples 30-32

Table 8 shows the effect of differing amounts of poly(butylene terephthalate) in combination with poly(ethylene terephthalate). The data indicates that the improvement in Vicat softening temperature is highest when the composition comprises greater than 20 weight percent of poly(butylene terephthalate).

TABLE 8

|       | C.Ex-34 | C.Ex-35 | C.Ex-36 | C.Ex-37 | C.Ex.-38 | Ex.-30 | Ex.-31 | Ex.-32 |
|-------|---------|---------|---------|---------|----------|--------|--------|--------|
| PC-2  | 51.87   | 41.87   | 31.87   | 21.87   | 41.87    | 31.87  | 21.87  | 11.87  |
| PPC   | 20      | 20      | 20      | 20      | 20       | 20     | 20     | 20     |
| PBT-1 | 10      | 15      | 20      | 25      | 10       | 15     | 20     | 25     |
| PBT-2 | 10      | 15      | 20      | 25      | 10       | 15     | 20     | 25     |
| PET   | —       | —       | —       | —       | 10       | 10     | 10     | 10     |
| MBS   | 7       | 7       | 7       | 7       | 7        | 7      | 7      | 7      |

TABLE 8-continued

|  | C.Ex-34 | C.Ex-35 | C.Ex-36 | C.Ex-37 | C.Ex.-38 | Ex.-30 | Ex.-31 | Ex.-32 |
|---|---|---|---|---|---|---|---|---|
| UVA 235 | 0.25 | 0.25 | 0.25 | 0.25 | 0.25 | 0.25 | 0.25 | 0.25 |
| Additives | 0.78 | 0.78 | 0.78 | 0.78 | 0.78 | 0.78 | 0.78 | 0.78 |
| Talc | 0.1 | 0.1 | 0.1 | 0.1 | 0.1 | 0.1 | 0.1 | 0.1 |
| Vicat | 110.3 | 100.8 | 87.5 | 108.4 | 114.9 | 114.2 | 115.0 | 119.6 |
| ΔVicat | — | — | — | — | 4.6 | 13.4 | 27.6 | 11.3 |
| ΔVicat per wt-% PET | — | — | — | — | 0.5 | 1.3 | 2.8 | 1.1 |
| HDT | 99.6 | 86.1 | 74.5 | 74.9 | 103.7 | 96.1 | 93.1 | 90.9 |
| ΔHDT | — | — | — | — | 4.1 | 10.0 | 18.7 | 16.0 |
| ΔHDT per wt-% PET | — | — | — | — | 0.4 | 1.0 | 1.9 | 1.6 |

Comparative Examples 39-43 and Example 33

Table 9 shows the effect of differing the polyester carbonate. Compositions made with a polyester carbonate having 90 mol % of ITR units do not appear to have the same heat resistance as compositions made with a polyester carbonate having 20 mol % ITR units.

TABLE 9

|  | C.Ex-39 | C.Ex-40 | C.Ex-41 | Ex-33 | C.Ex-42 | C.Ex-43 |
|---|---|---|---|---|---|---|
| PC-2 | 41.87 | 41.87 | 41.87 | 31.87 | 31.87 | 31.87 |
| PPC | 20 | — | — | 20 | — | — |
| ITR-PC 1 | — | 20 | — | — | 20 | — |
| ITR-PC 2 | — | — | 20 | — | — | 20 |
| PBT-1 | 15 | 15 | 15 | 15 | 15 | 15 |
| PBT-2 | 15 | 15 | 15 | 15 | 15 | 15 |
| PET | — | — | — | 10 | 10 | 10 |
| MBS | 7 | 7 | 7 | 7 | 7 | 7 |
| UVA 235 | 0.25 | 0.25 | 0.25 | 0.25 | 0.25 | 0.25 |
| Additives | 0.78 | 0.78 | 0.78 | 0.78 | 0.78 | 0.78 |
| Talc | 0.1 | 0.1 | 0.1 | 0.1 | 0.1 | 0.1 |
| Vicat | 96.4 | 107.4 | 110.0 | 115.6 | 113.8 | 92.6 |
| ΔVicat | — | — | — | 19.2 | 6.3 | -17.4 |
| ΔVicat per wt-% PET | — | — | — | 1.9 | 0.6 | -1.7 |
| HDT | 87.9 | 91.7 | 105.0 | 99.9 | 97.4 | 84.3 |
| ΔHDT | — | — | — | 12.0 | 5.6 | -20.7 |
| ΔHDT per wt-% PET | — | — | — | 1.2 | 0.6 | -2.1 |

Examples 34-40

Table 10 explores the effect of additives on the increase in heat resistance of the composition with the inclusion of polyethylene. For the most part, the presence or absence of an individual additive had little impact on the improvement in the Vicat value. The absence of the phosphorus containing acidic compound, in this case $H_3PO_3$, showed some effect but overall the inclusion of polyethylene still made a remarkable improvement in the heat resistance.

TABLE 10

|  | Ex-34 | Ex.35 | Ex.36 | Ex.37 | Ex.38 | Ex.39 | Ex.40 |
|---|---|---|---|---|---|---|---|
| PC-2 | 31.87 | 38.87 | 32.47 | 31.97 | 31.95 | 32.12 | 32.9 |
| PPC | 20 | 20 | 20 | 20 | 20 | 20 | 20 |
| PBT-1 | 15 | 15 | 15 | 15 | 15 | 15 | 15 |
| PBT-2 | 15 | 15 | 15 | 15 | 15 | 15 | 15 |
| PET | 10 | 10 | 10 | 10 | 10 | 10 | 10 |
| MBS | 7 |  | 7 | 7 | 7 | 7 | 7 |
| PETS | 0.6 | 0.6 |  | 0.6 | 0.6 | 0.6 |  |
| AO 1010 | 0.1 | 0.1 | 0.1 |  | 0.1 | 0.1 |  |
| $H_3PO_3$ | 0.08 | 0.08 | 0.08 | 0.08 |  | 0.08 |  |
| UVA 235 | 0.25 | 0.25 | 0.25 | 0.25 | 0.25 |  |  |
| Talc | 0.1 | 0.1 | 0.1 | 0.1 | 0.1 | 0.1 | 0.1 |
| Vicat | 114.2 | 116.0 | 117.5 | 116.5 | 104.2 | 116.5 | 110.1 |
| HDT | 96.1 | 100.9 | 100.1 | 98.7 | 89.3 | 99.4 | 95.7 |

Embodiment 1: A thermoplastic composition comprising: 0 to 50 weight percent of a polycarbonate; 10 to 50 weight percent of a polyester carbonate copolymer; 5 to 20 weight percent of a poly(ethylene terephthalate); 20 to 50 weight percent of a poly(butylene terephthalate); and optionally 5 to 30 weight percent of an impact modifier wherein weight percent is based on the combined amounts of polycarbonate, polyester carbonate copolymer, poly(ethylene terephthalate), poly(butylene terephthalate) and optional impact modifier.

Embodiment 2: The composition of Embodiment 1, comprising 5 to 10 weight percent of the impact modifier, wherein weight percent is based on the combined amounts of polycarbonate, polyester carbonate copolymer, poly(ethylene terephthalate), poly(butylene terephthalate) and optional impact modifier.

Embodiment 3: The composition of Embodiment 1 or 2, further comprising a nucleating agent.

Embodiment 4: The composition of any one of the preceding embodiments, wherein the combined amounts of poly(ethylene terephthalate) and poly(butylene terephthalate) is 30 to 50 weight percent, based on the combined amounts of the polycarbonate, polyester carbonate copolymer, poly(ethylene terephthalate), poly(butylene terephthalate) and optional impact modifier.

Embodiment 5: The composition of any one of the preceding embodiments wherein the composition has a Vicat softening point greater than or equal to 110 degrees Celsius as determined by ISO-306 B120 at a load of 50N and a speed of 120° C./hr.

Embodiment 6: The composition of any one of the preceding embodiments wherein the composition has a heat distortion temperature greater than or equal to 90 degrees Celsius as determined by as determined by ISO 75 flatwise at a load of 0.45 MPa.

Embodiment 7: The composition of any one of the preceding embodiments wherein the polycarbonate has a weight average molecular weight of 15,000 to 40,000 g/mol when determined using gel permeation chromatography with polycarbonate standards.

Embodiment 8: The composition of any one of the preceding embodiments, wherein the poly(butylene terephthalate) has a weight average molecular weight of 60,000 to 150,000 g/mol as determined using gel permeation chromatography with polystyrene standards.

Embodiment 9: The composition of any one of embodiments 2 to 8, wherein the impact modifier comprises methacrylate-butadiene-styrene copolymer.

Embodiment 10: The composition of any one of embodiments 1 to 9, wherein the composition has a heat distortion temperature 10 degrees higher than a comparable composition without poly(ethylene terephthalate).

Embodiment 11: A thermoplastic composition comprises 10 to 30 weight percent of a polycarbonate; 15 to 25 weight percent of a polyester carbonate copolymer; 8 to 16 weight percent of a poly(ethylene terephthalate); 30 to 40 weight percent of a poly(butylene terephthalate); and 7 to 15 weight percent of an impact modifier wherein weight percent is based on the combined amounts of polycarbonate, polyester carbonate copolymer, poly(ethylene terephthalate), poly(butylene terephthalate) and optional impact modifier.

Embodiment 12. The composition of Embodiment 11, further comprising a nucleating agent.

Embodiment 13: The composition of Embodiment 11 or 12, wherein the combined amounts of poly(ethylene terephthalate) and poly(butylene terephthalate) is 30 to 50 weight percent, based on the combined amounts of the polycarbonate, polyester carbonate copolymer, poly(ethylene terephthalate), poly(butylene terephthalate) and optional impact modifier.

Embodiment 14: The composition of any one of Embodiments 11 to 13, wherein the composition has a Vicat softening point greater than or equal to 100 degrees Celsius as determined by ISO-306 B120 at a load of 50N and a speed of 120° C./hr.

Embodiment 15: The composition of any one of Embodiments 11 to 14, wherein the composition has a heat distortion temperature greater than or equal to 90 degrees Celsius as determined by as determined by ISO 75 flatwise at a load of 0.45 MPa.

Embodiment 16: The composition of any one of Embodiments 11 to 15, wherein the polycarbonate has a weight average molecular weight of 15 to 40 kilo Daltons when determined using gel permeation chromatography with polycarbonate standards.

Embodiment 17: The composition of any one of Embodiments 11 to 16, wherein the poly(butylene terephthalate) has a weight average molecular weight of 60 to 150 kDa as determined using gel permeation chromatography with polystyrene standards.

Embodiment 18: The composition of any one of Embodiments 11 to 17, wherein the impact modifier comprises methacrylate-butadiene-styrene copolymer.

Embodiment 19: The composition of any one of Embodiments 11 to 18, wherein the composition has a heat distortion temperature 10 degrees higher than a comparable composition without poly(ethylene terephthalate).

Embodiment 20: A vehicular body part comprising 20 to 50 weight percent of a polycarbonate; 10 to 50 weight percent of a polyester carbonate copolymer; 5 to 20 weight percent of a poly(ethylene terephthalate); 20 to 50 weight percent of a poly(butylene terephthalate); and optionally 5 to 10 weight percent of an impact modifier wherein weight percent is based on the combined amounts of polycarbonate, polyester carbonate copolymer, poly(ethylene terephthalate), poly(butylene terephthalate) and optional impact modifier.

The singular forms "a," "an," and "the" include plural referents unless the context clearly dictates otherwise. "Or" means "and/or" unless clearly indicated otherwise by context. The endpoints of all ranges directed to the same component or property are inclusive and independently combinable (e.g., ranges of "less than or equal to 25 wt %, or 5 wt % to 20 wt %," is inclusive of the endpoints and all intermediate values of the ranges of "5 wt % to 25 wt %," etc.). Disclosure of a narrower range or more specific group in addition to a broader range is not a disclaimer of the broader range or larger group. The suffix "(s)" is intended to include both the singular and the plural of the term that it modifies, thereby including at least one of that term (e.g., the colorant(s) includes at least one colorants). "Optional" or "optionally" means that the subsequently described event or circumstance can or can not occur, and that the description includes instances where the event occurs and instances where it does not. Unless defined otherwise, technical and scientific terms used herein have the same meaning as is commonly understood by one of skill in the art to which this invention belongs. A "combination" is inclusive of blends, mixtures, alloys, reaction products, and the like.

As used herein, the term "hydrocarbyl" and "hydrocarbon" refers broadly to a substituent comprising carbon and hydrogen, optionally with 1 to 3 heteroatoms, for example, oxygen, nitrogen, halogen, silicon, sulfur, or a combination thereof; "alkyl" refers to a straight or branched chain, saturated monovalent hydrocarbon group; "alkylene" refers to a straight or branched chain, saturated, divalent hydrocarbon group; "alkylidene" refers to a straight or branched chain, saturated divalent hydrocarbon group, with both valences on a single common carbon atom; "alkenyl" refers to a straight or branched chain monovalent hydrocarbon group having at least two carbons joined by a carbon-carbon double bond; "cycloalkyl" refers to a non-aromatic monovalent monocyclic or multicylic hydrocarbon group having at least three carbon atoms, "cycloalkenyl" refers to a non-aromatic cyclic divalent hydrocarbon group having at least three carbon atoms, with at least one degree of unsaturation; "aryl" refers to an aromatic monovalent group containing only carbon in the aromatic ring or rings; "arylene" refers to an aromatic divalent group containing only carbon in the aromatic ring or rings; "alkylaryl" refers to an aryl group that has been substituted with an alkyl group as defined above, with 4-methylphenyl being an exemplary alkylaryl group; "arylalkyl" refers to an alkyl group that has been substituted with an aryl group as defined above, with benzyl being an exemplary arylalkyl group; "acyl" refers to an alkyl group as defined above with the indicated number of carbon atoms attached through a carbonyl carbon bridge (—C(=O)—); "alkoxy" refers to an alkyl group as defined above with the indicated number of carbon atoms attached through an oxygen bridge (—O—); and "aryloxy" refers to an aryl group as defined above with the indicated number of carbon atoms attached through an oxygen bridge (—O—).

Unless otherwise indicated, each of the foregoing groups can be unsubstituted or substituted, provided that the substitution does not significantly adversely affect synthesis, stability, or use of the compound. The term "substituted" as used herein means that at least one hydrogen on the designated atom or group is replaced with another group, provided that the designated atom's normal valence is not exceeded. When the substituent is oxo (i.e., =O), then two hydrogens on the atom are replaced. Combinations of substituents and/or variables are permissible provided that the substitutions do not significantly adversely affect synthesis or use of the compound. Exemplary groups that can be present on a "substituted" position include, but are not limited to, cyano; hydroxyl; nitro; azido; alkanoyl (such as a $C_{2-6}$ alkanoyl group such as acyl); carboxamido; $C_{1-6}$ or $C_{1-3}$ alkyl, cycloalkyl, alkenyl, and alkynyl (including groups having at least one unsaturated linkages and from 2 to 8, or 2 to 6 carbon atoms); $C_{1-6}$ or $C_{1-3}$ alkoxys; $C_{6-10}$ aryloxy such as phenoxy; $C_{1-6}$ alkylthio; $C_{1-6}$ or $C_{1-3}$ alkylsulfinyl; $C_{1-6}$ or $C_{1-3}$ alkylsulfonyl; aminodi($C_{1-6}$ or $C_{1-3}$)alkyl; $C_{6-12}$ aryl having at least one aromatic rings (e.g., phenyl, biphenyl, naphthyl, or the like, each ring either substituted or unsubstituted aromatic); $C_{7-19}$ arylalkyl having 1 to 3 separate or fused rings and from 6 to 18 ring carbon atoms; or arylalkoxy having 1 to 3 separate or fused rings and from 6 to 18 ring carbon atoms, with benzyloxy being an exemplary arylalkoxy.

All cited patents, patent applications, and other references are incorporated herein by reference in their entirety. However, if a term in the present application contradicts or conflicts with a term in the incorporated reference, the term from the present application takes precedence over the conflicting term from the incorporated reference.

While typical embodiments have been set forth for the purpose of illustration, the foregoing descriptions should not be deemed to be a limitation on the scope herein. Accordingly, various modifications, adaptations, and alternatives can occur to one skilled in the art without departing from the spirit and scope herein.

What is claimed is:

1. A thermoplastic composition comprising:
   10 to 30 weight percent of a polycarbonate;
   15 to 25 weight percent of a polyester carbonate copolymer;
   8 to 16 weight percent of a poly(ethylene terephthalate);
   30 to 40 weight percent of a poly(butylene terephthalate); and
   7 to 15 weight percent of an impact modifier wherein the impact modifier comprises methacrylate-butadiene-styrene copolymer and weight percent is based on the combined amounts of the polycarbonate, the polyester carbonate copolymer, the poly(ethylene terephthalate), the poly(butylene terephthalate) and the impact modifier.

2. The composition of claim 1, further comprising a nucleating agent.

3. The composition of claim 1, wherein the combined amounts of the poly(ethylene terephthalate) and the poly(butylene terephthalate) is 38 to 50 weight percent, based on the combined amounts of the polycarbonate, the polyester carbonate copolymer, the poly(ethylene terephthalate), the poly(butylene terephthalate) and the impact modifier.

4. The composition of claim 1, wherein the composition has a Vicat softening point greater than or equal to 110 degrees Celsius as determined by ISO-306 B120 at a load of 50N and a speed of 120° C./hr; and/or wherein the composition has a heat distortion temperature greater than or equal to 90 degrees Celsius as determined by as determined by ISO 75 flatwise at a load of 0.45 MPa.

5. The composition of claim 1, wherein the polycarbonate has a weight average molecular weight of 15,000 to 40,000 g/mol when determined using gel permeation chromatography with polycarbonate standards; and/or wherein the poly(butylene terephthalate) has a weight average molecular weight of 60,000 to 150,000 g/mol as determined using gel permeation chromatography with polystyrene standards.

6. The composition of claim 1, wherein the composition has a heat distortion temperature 10 degrees higher than a comparable composition without poly(ethylene terephthalate).

7. An article comprising the composition of claim 1.

8. The article of claim 7, wherein the article is an automotive or vehicular body panel.

9. The article of claim 8, wherein the automotive or vehicular body panel is a bumper cover or a bumper.

10. A thermoplastic composition comprising:
    0 to 50 weight percent of a polycarbonate;
    10 to 50 weight percent of a polyester carbonate copolymer;
    5 to 20 weight percent of a poly(ethylene terephthalate);
    20 to 50 weight percent of a poly(butylene terephthalate); and
    5 to 10 weight percent of an impact modifier;
    wherein weight percent is based on the combined amounts of the polycarbonate, the polyester carbonate copolymer, the poly(ethylene terephthalate), the poly(butylene terephthalate), and the impact modifier; and
    wherein the impact modifier comprises methacrylate-butadiene-styrene copolymer.

11. The composition of claim 10, wherein the combined amounts of the poly(ethylene terephthalate) and the poly(butylene terephthalate) is 30 to 50 weight percent, based on the combined amounts of the polycarbonate, the polyester carbonate copolymer, the poly(ethylene terephthalate), the poly(butylene terephthalate) and the impact modifier.

12. The composition of claim 10, wherein the composition has a Vicat softening point greater than or equal to 100 degrees Celsius as determined by ISO-306 B120 at a load of 50N and a speed of 120° C./hr; and/or wherein the composition has a heat distortion temperature greater than or equal to 90 degrees Celsius as determined by as determined by ISO 75 flatwise at a load of 0.45 MPa.

13. The composition of claim 10, wherein the polycarbonate has a weight average molecular weight of 15 to 40 kiloDaltons when determined using gel permeation chromatography with polycarbonate standards; and/or wherein the poly(butylene terephthalate) has a weight average molecular weight of 60 to 150 kDa as determined using gel permeation chromatography with polystyrene standards.

* * * * *